(12) United States Patent
Ito et al.

(10) Patent No.: US 10,162,457 B2
(45) Date of Patent: Dec. 25, 2018

(54) DISPLAY DEVICE WITH TOUCH DETECTION FUNCTION

(71) Applicant: Japan Display Inc., Tokyo (JP)

(72) Inventors: Daisuke Ito, Tokyo (JP); Koji Shigehiro, Tokyo (JP); Nobuhiko Yokoo, Tokyo (JP)

(73) Assignee: Japan Display Inc., Tokyo (JP)

( * ) Notice: Subject to any disclaimer, the term of this patent is extended or adjusted under 35 U.S.C. 154(b) by 264 days.

(21) Appl. No.: 15/200,179

(22) Filed: Jul. 1, 2016

(65) Prior Publication Data

US 2017/0010739 A1   Jan. 12, 2017

(30) Foreign Application Priority Data

Jul. 6, 2015   (JP) ................. 2015-135268

(51) Int. Cl.
| | |
|---|---|
| G06F 3/041 | (2006.01) |
| G06F 3/044 | (2006.01) |
| G06F 1/32 | (2006.01) |
| G02F 1/1333 | (2006.01) |

(52) U.S. Cl.
CPC ............ G06F 3/0416 (2013.01); G06F 1/324 (2013.01); G06F 1/3262 (2013.01); G06F 3/044 (2013.01); G06F 3/0412 (2013.01); *G02F 1/13338* (2013.01); *Y02D 10/126* (2018.01)

(58) Field of Classification Search
CPC .... G09G 3/34; G09G 3/36; F21V 7/04; G06F 1/32; G06F 3/044; G06F 3/041; G02F 1/133
See application file for complete search history.

(56) References Cited

U.S. PATENT DOCUMENTS

| 7,683,887 B2 | 3/2010 | Yasukawa | |
|---|---|---|---|
| 2010/0253639 A1* | 10/2010 | Huang | ................. G06F 3/0412 345/173 |
| 2013/0069894 A1 | 3/2013 | Chen et al. | |
| 2014/0184539 A1* | 7/2014 | Shin | ..................... G06F 3/0412 345/173 |

(Continued)

FOREIGN PATENT DOCUMENTS

| JP | 2005-164709 A | 6/2005 |
|---|---|---|
| JP | 2013-065301 A | 4/2013 |

*Primary Examiner* — Pegeman Karimi
(74) *Attorney, Agent, or Firm* — K&L Gates LLP

(57) ABSTRACT

A display device with a touch detection function includes a substrate, pixel electrodes arranged in a matrix in a display region on a plane parallel to the substrate, a display function layer having a function to display the image in the display region, drive electrodes provided facing the pixel electrodes, touch detection electrodes that form electrostatic capacitance between there and the drive electrodes, a control unit that generates a control signal to switch between a display operation period for applying a display signal between the pixel and drive electrodes and a display stop period for stopping the display operation. The control unit generates first and second control signals respectively having a first frequency and a second frequency that is different from the first frequency, and has first and second operation modes respectively including a period controlled by the first control signal and a period controlled by the second control signal.

18 Claims, 15 Drawing Sheets

(56) References Cited

U.S. PATENT DOCUMENTS

| | | | |
|---|---|---|---|
| 2015/0144920 A1* | 5/2015 | Yamazaki | H01L 27/323 |
| | | | 257/40 |
| 2017/0076079 A1* | 3/2017 | Ran | G06F 21/32 |
| 2018/0095658 A1* | 4/2018 | Tokutake | G06F 3/041 |

\* cited by examiner

DISPLAY DEVICE WITH TOUCH DETECTION FUNCTION

CROSS-REFERENCE TO RELATED APPLICATIONS

This application claims priority to Japanese Application No. 2015-135268, filed on Jul. 6, 2015, the contents of which are incorporated by reference herein in its entirety.

BACKGROUND

1. Technical Field

The present disclosure relates to a display device with a touch detection function.

2. Description of the Related Art

In recent years, attention has been paid for a touch detection device that can detect an external proximity object, or so-called a touch panel. The touch panel is used for a display device with a touch detection function that is mounted on or integrated with a display device such as a liquid crystal display device. The display device with a touch detection function causes the display device to display various button images and the like so that information can be input through the touch panel in place of normal mechanical buttons.

Japanese Patent Application Laid-open Publication No. 2013-065301 (JP-A-2013-065301) discloses a display module with a touch sensor integrated therein. The display module disclosed in JP-A-2013-065301 detects a noise level by analyzing detection signals from the touch sensor, and changes the mode of drive signals for the touch sensor, thus being capable of reducing the noise. Japanese Patent Application Laid-open Publication No. 2005-164709 (JP-A-2005-164709) discloses a display system constituted by an input device including conductive thin plates and a display device. The display system disclosed in JP-A-2005-164709 applies a noise cancelling signal having the same amplitude and phase as those of a drive signal applied to the display device to the input device so as to reduce temporal variation in electric field acting on an electric charge present between the display device and the input device, thus reducing noise, vibration, and unpleasant sound.

In the display module disclosed in JP-A-2013-065301, in order to detect the position of a touch input, limitation is imposed on, for example, the drive frequency of the drive signals supplied to the touch sensor. This may lead to a case where the drive signals are difficult to be changed so as to reduce the noise. The display system disclosed in JP-A-2005-164709 includes a noise cancelling signal generator for generating a noise cancelling signal in addition to a circuit for generating the drive signal. This may increase power consumption. In addition, although the noise decreases in members (such as the conductive thin plates) that have received the noise cancelling signal, noise may occur in a power supply circuit for generating the drive signal, for example.

For the foregoing reasons, there is a need for a display device with a touch detection function capable of suppressing noise.

SUMMARY

According to an aspect, a display device with a touch detection function includes a substrate, a plurality of pixel electrodes that are arranged in a matrix in a display region where an image is displayed, on a plane parallel to the substrate, a display function layer having an image display function to display the image in the display region, a plurality of drive electrodes provided so as to face the pixel electrodes, a plurality of touch detection electrodes that form electrostatic capacitance between the touch detection electrodes and the drive electrodes, a control unit that generates a control signal to perform switching between a display operation period for applying a signal for display between the pixel electrodes and the drive electrodes and a display stop period for stopping the display operation. The control unit generates a first control signal having a first frequency and a second control signal having a second frequency different form the first frequency and the control unit has a first operation mode including a period controlled by the first control signal and a second operation mode including a period controlled by the second control signal.

DETAILED DESCRIPTION

Figure 1:
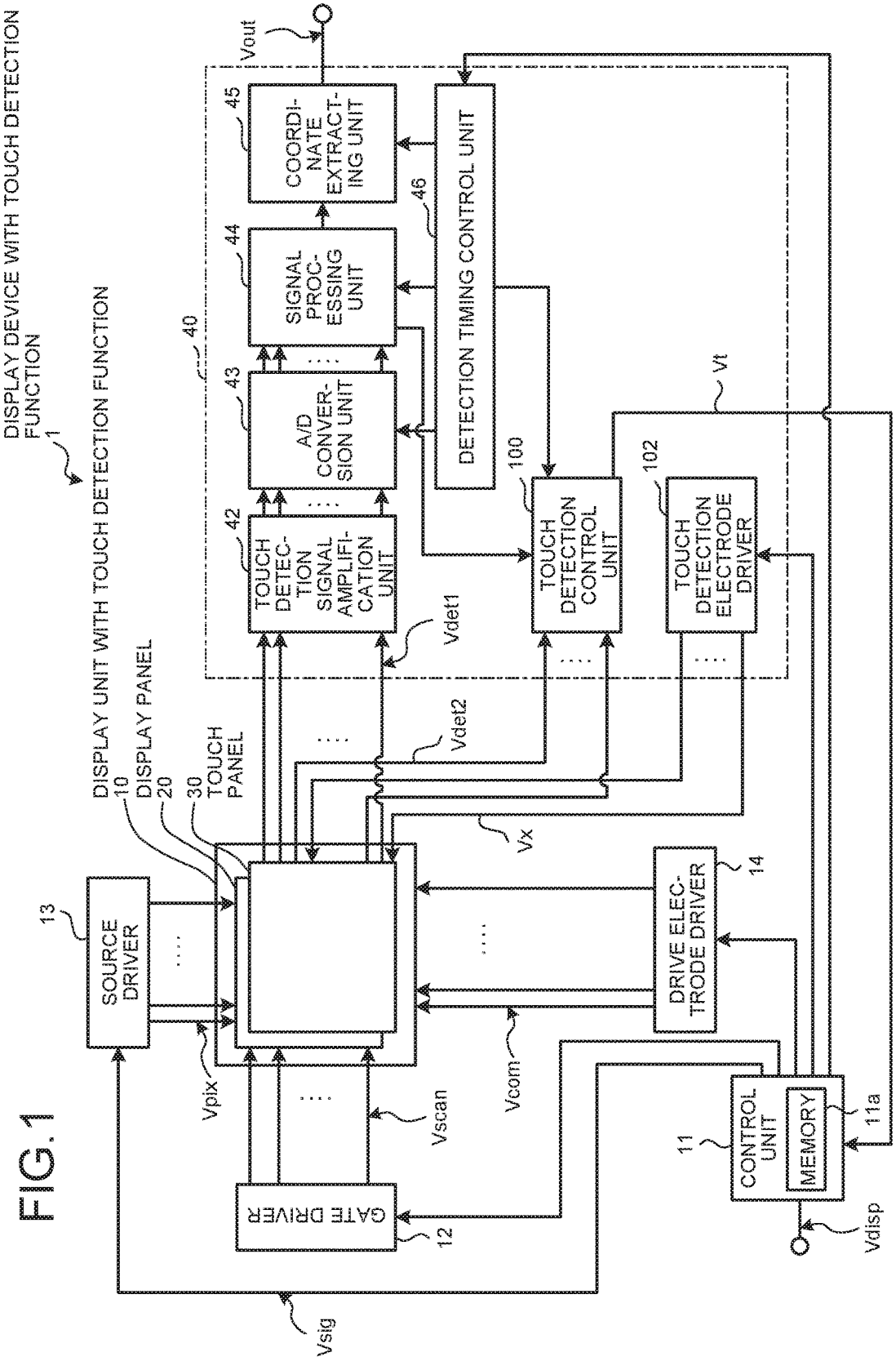
FIG. 1 is a block diagram illustrating a configuration example of a display device with a touch detection function according to a first embodiment of the present invention.

The following describes embodiments in detail with reference to the drawings. The present invention is not limited to the embodiments described below. Components described below include a component that is easily conceivable by those skilled in the art and substantially the same component. The components described below can be appropriately combined. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

First Embodiment

FIG. 1 is a block diagram illustrating a configuration example of a display device with a touch detection function according to a first embodiment. A display device 1 with a touch detection function includes a display unit 10 with a touch detection function, a control unit 11, a gate driver 12, a source driver 13, a drive electrode driver 14, and a touch detection unit 40. The display device 1 with a touch detection function is a display device in which a touch detection function is incorporated in the display unit 10 with a touch detection function. The display unit 10 with a touch detection function is a display device integrating a display panel 20 including a liquid crystal display element as a display element with a touch panel 30 serving as a touch detection device for detecting a touch input. The display unit 10 with a touch detection function may be so-called an on-cell device in which the touch panel 30 is mounted on the display panel 20. The display panel 20 may be, for example, an organic EL display panel.

The display device 1 with a touch detection function of the present embodiment has a normal operation mode and a sleep mode in which an operation is performed with smaller power consumption than in the normal operation mode. In the normal operation mode, the display device 1 with a touch detection function time-divisionally performs a display operation of displaying an image and a first touch detection operation of detecting the position of a touch input to a display region. In the sleep mode, the display device 1 with a touch detection function stops the first touch detection operation, and performs the display operation and a display stop operation of stopping the display operation in a time-division manner. If no touch input is detected for a certain period in the normal operation mode, the display device 1 with a touch detection function shifts into the sleep mode. While the display device 1 with a touch detection function stops the first touch detection operation in the sleep mode, the display device 1 with a touch detection function performs a second touch detection operation of detecting contact or proximity of a conductor, such as a finger, at least once in an image display period of one frame (1F). If the contact or proximity of the conductor such as a finger is detected by the second touch detection operation, the display device 1 with a touch detection function shifts into the normal operation mode.

The gate driver 12 has a function of sequentially selecting one horizontal line to be a display driving target of the display unit 10 with a touch detection function based on the control signal supplied from the control unit 11.

The source driver 13 is a circuit that supplies a pixel signal Vpix to each sub-pixel SPix (described below) in the display unit 10 with a touch detection function based on the control signal supplied from the control unit 11.

The drive electrode driver 14 is a circuit that supplies a first drive signal Vcom to drive electrodes COML (described below) in the display unit 10 with a touch detection function based on the control signal supplied from the control unit 11.

The display panel 20 includes the display elements that perform display by sequentially scanning one horizontal line according to scan signals Vscan supplied from the gate driver 12, as will be described below.

The control unit 11 is a circuit that supplies the control signal to each of the gate driver 12, the source driver 13, the drive electrode driver 14, and the touch detection unit 40 based on a video signal Vdisp supplied from the outside, and thus controls the drivers 12 to 14 and the touch detection unit 40 so as to operate in synchronization with one another. The control unit 11 includes a memory 11a for temporary storage of video information of the video signal Vdisp. The memory 11a has a size enough for storing an amount of data obtained by dividing video information for one frame according to the frequency at which the display operation in the normal operation mode is performed in a time-division manner. The control unit 11 supplies an image signal Vsig obtained by time-division multiplexing the pixel signals Vpix to the source driver 13.

The touch panel 30 operates based on the basic principle of capacitance type touch detection, and has a first touch detection mode of performing the touch detection by a mutual capacitance method and a second touch detection mode of performing the touch detection by a self-capacitance method. In the normal operation mode, the touch panel 30 can detect the position of contact or proximity of the external conductor, such as a finger, by performing the mutual capacitance type touch detection. When the touch input is detected in the normal operation mode, the touch panel 30 outputs a first touch detection signal Vdet1, which is then supplied to the touch detection unit 40.

In the sleep mode, the touch panel 30 can detect the contact or proximity of the external conductor, such as a finger, by performing the self-capacitance type touch detection. When the contact or proximity of the external conductor such as a finger is detected in the sleep mode, the touch panel 30 outputs a second touch detection signal Vdet2, which is then supplied to the touch detection unit 40.

The touch detection unit 40 is a circuit that detects whether there is a touch on the touch panel 30 based on the control signal supplied from the control unit 11 and the first and second touch detection signals Vdet1 and Vdet2 supplied from the touch panel 30. If the touch panel 30 is touched, the touch detection unit 40 obtains, for example, coordinates of the touch in the display region. The touch detection unit 40 includes a touch detection signal amplification unit 42, an analog-to-digital (A/D) converter 43, a signal processing unit 44, a coordinate extracting unit 45, and a detection timing control unit 46. In the normal operation mode, the touch detection signal amplification unit 42, the A/D conversion unit 43, the signal processing unit 44, and the coordinate extracting unit 45 operate to detect the coordinates of the touch input position based on the first touch detection signal Vdet1.

The touch detection unit 40 also includes a touch detection control unit 100 and a touch detection electrode driver 102. In the normal operation mode, the touch detection control unit 100 receives the information on whether a touch input is detected from the signal processing unit 44, and if no touch input is detected for a predetermined period, activates an operation mode control signal Vt and outputs it to the control unit 11. The control unit 11 shifts into and stays in the sleep mode while the operation mode control signal Vt is activated. In the sleep mode, mainly the touch detection control unit 100 and the touch detection electrode driver 102 operate to detect the contact or proximity of the external conductor based on the second touch detection signal Vdet2. If the touch detection control unit 100 detects the contact or proximity of the external conductor, the touch detection control unit 100 deactivates the operation mode control signal Vt, and outputs it to the control unit 11. The control unit 11 shifts into and stays in the normal operation mode while the operation mode control signal Vt is deactivated.

Figure 2:
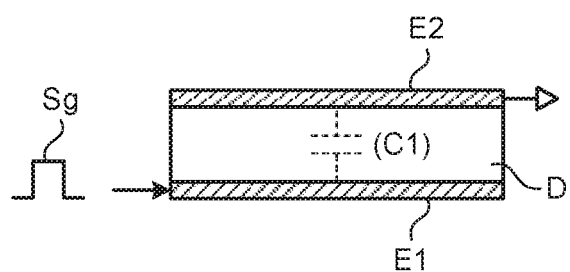
FIG. 2 is a diagram for explaining the basic principle of mutual capacitance type touch detection, illustrating a state in which a finger is neither in contact with nor in proximity to a touch detection electrode.
Figure 3:
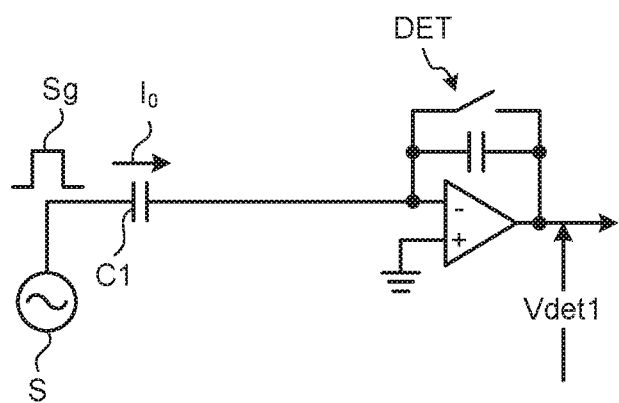
FIG. 3 is a diagram illustrating an example of an equivalent circuit in the state illustrated in FIG. 2 in which the finger is neither in contact nor in proximity to the touch detection electrode.
Figure 4:
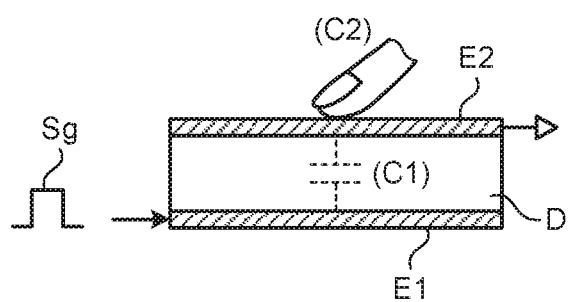
FIG. 4 is a diagram for explaining the basic principle of the mutual capacitance type touch detection, illustrating a state in which a finger is in contact with or in proximity to the touch detection electrode.
Figure 5:
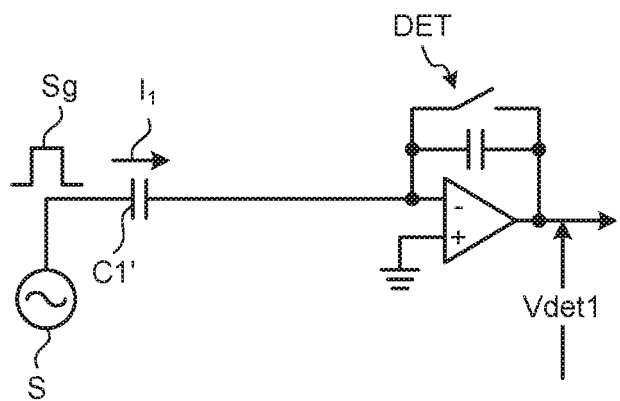
FIG. 5 is a diagram illustrating an example of an equivalent circuit in the state illustrated in FIG. 4 in which the finger is in contact with or in proximity to the touch detection electrode.
Figure 6:
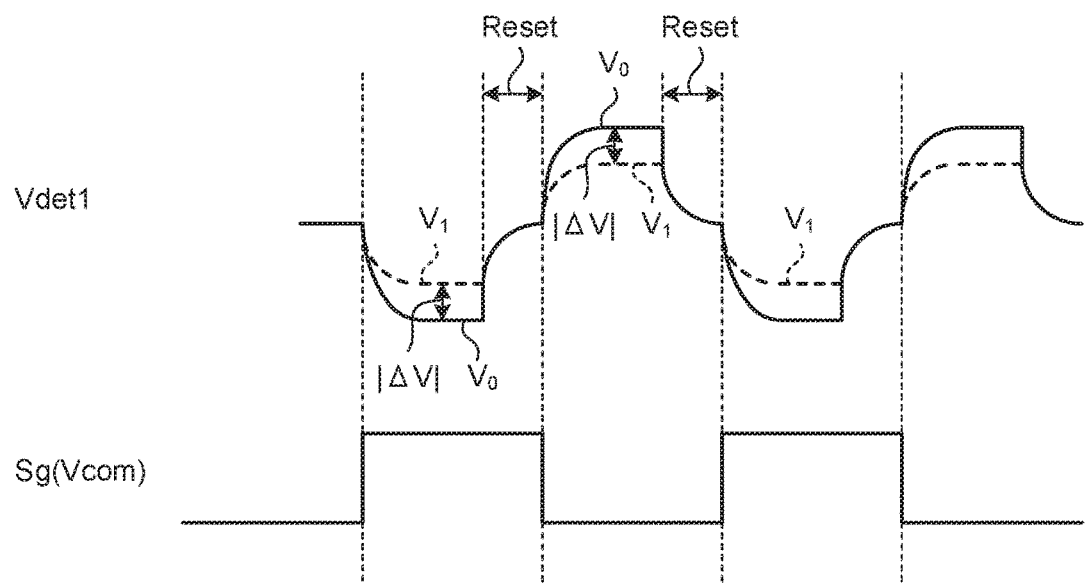
FIG. 6 is a diagram illustrating an example of waveforms of a drive signal and a touch detection signal of the mutual capacitance type touch detection.

As described above, the touch panel 30 operates based on the basic principle of capacitance touch detection. The following describes, with reference to FIGS. 2 to 6, the basic principle of mutual capacitance touch detection of the first touch detection mode performed by the display device 1 with a touch detection function according to the present embodiment. FIG. 2 is a diagram for explaining the basic principle of mutual capacitance type touch detection, illustrating a state in which a finger is neither in contact with nor in proximity to a touch detection electrode. FIG. 3 is a diagram illustrating an example of an equivalent circuit in the state illustrated in FIG. 2 in which the finger is neither in contact nor in proximity to the touch detection electrode. FIG. 4 is a diagram for explaining the basic principle of the mutual capacitance type touch detection, illustrating a state in which a finger is in contact with or in proximity to the touch detection electrode. FIG. 5 is a diagram illustrating an example of an equivalent circuit in the state illustrated in FIG. 4 in which the finger is in contact with or in proximity to the touch detection electrode. FIG. 6 is a diagram illustrating an example of waveforms of a drive signal and a touch detection signal. The following describes a case in which a finger is brought into contact with or proximity to the touch panel. Alternatively, an object including a conductor such as a stylus pen may be replaced with a finger.

For example, as illustrated in FIG. 2, a capacitive element C1 includes a pair of electrodes, i.e., a drive electrode E1 and a touch detection electrode E2, that are arranged facing each other with a dielectric D interposed therebetween. As illustrated in FIG. 3, one end of the capacitive element C1 is coupled to an alternating-current (AC) signal source (driving signal source) S, and the other end thereof is coupled to a voltage detector (touch detection unit) DET. The voltage detector DET is, for example, an integrating circuit included in the touch detection signal amplification unit 42 illustrated in FIG. 1.

When an AC rectangular wave Sg having a predetermined frequency (for example, about several kHz to several hundreds kilohertz) is applied to the drive electrode E1 (one end of the capacitive element C1) from the AC signal source S, an output waveform (first touch detection signal Vdet1) as illustrated in FIG. 6 appears via the voltage detector DET coupled to the touch detection electrode E2 (the other end of the capacitive element C1). The AC rectangular wave Sg corresponds to the first drive signal Vcom input from the drive electrode driver 14.

In a state in which the finger is not in contact with (or in proximity to) the touch panel (non-contact state), as illustrated in FIGS. 2 and 3, current $I_0$ corresponding to a capacitance value of the capacitive element C1 flows in accordance with charge and discharge of the capacitive element C1. The voltage detector DET illustrated in FIG. 3 converts variation in the current $I_0$ corresponding to the AC rectangular wave Sg into variation in a voltage (a waveform $V_0$ of a solid line (refer to FIG. 6)).

On the other hand, in a state in which the finger is in contact with (or in proximity to) the touch panel (contact state), as illustrated in FIG. 4, capacitance C2 formed by the finger is in contact with or in proximity to the touch detection electrode E2, so that capacitance corresponding to a fringe between the drive electrode E1 and the touch detection electrode E2 is shielded. As a result, the capacitive element C1 functions as a capacitive element C1' having a capacitance value smaller than the capacitance value in the non-contact state. With reference to the equivalent circuit illustrated in FIG. 5, current $I_1$ flows through the capacitive element C1'. As illustrated in FIG. 6, the voltage detector DET converts variation in the current $I_1$ corresponding to the AC rectangular wave Sg into variation in the voltage (a waveform $V_1$ of a dotted line). In this case, amplitude of the waveform $V_1$ is smaller than that of the waveform $V_0$ described above. Accordingly, an absolute value $|\Delta V|$ of a voltage difference between the waveform $V_0$ and the waveform $V_1$ varies depending on influence of a conductor such as a finger that is approaching the touch panel from the outside. To accurately detect the absolute value $|\Delta V|$ of the voltage difference between the waveform $V_0$ and the waveform $V_1$, it is more preferable to provide, in an operation of the voltage detector DET, a period Reset for resetting charge and discharge of a capacitor in accordance with a frequency of the AC rectangular wave Sg through switching in the circuit.

The touch panel 30 illustrated in FIG. 1 sequentially performs scanning for each detection block in accordance with the first drive signal Vcom supplied from the drive electrode driver 14 to perform mutual capacitance touch detection.

The touch panel 30 outputs the touch detection signal Vdet1 for each detection block via the voltage detector DET illustrated in FIG. 3 and FIG. 5 from a plurality of touch detection electrodes TDL described below, and supplies the first touch detection signal Vdet1 to the touch detection signal amplification unit 42 of the touch detection unit 40.

The touch detection signal amplification unit 42 amplifies the first touch detection signal Vdet1 supplied from the touch panel 30 through mutual capacitance touch detection.

The touch detection signal amplification unit 42 may include an analog low pass filter (LPF) that outputs the first touch detection signal Vdet1 by removing a high frequency component (noise component) included in the first touch detection signal Vdet1.

The A/D conversion unit 43 samples each analog signal output from the touch detection signal amplification unit 42 at timing synchronized with the first drive signal Vcom, and converts the analog signal into a digital signal.

The signal processing unit 44 includes a digital filter that reduces a frequency component (noise component) included in the output signal of the A/D conversion unit 43, the frequency being other than a frequency at which the first drive signal Vcom is sampled. The signal processing unit 44 is a logic circuit that detects whether there is a touch on the touch panel 30 based on the output signal of the A/D conversion unit 43. The signal processing unit 44 performs processing of extracting only a difference of the detection signal caused by the finger. The signal of the difference caused by the finger has the absolute value $|\Delta V|$ of the difference between the waveform $V_0$ and the waveform $V_1$ described above. The signal processing unit 44 may perform an arithmetic operation for averaging the absolute values $|\Delta V|$ for each detection block to obtain an average value of the absolute values $|\Delta V|$. As a result, the signal processing unit 44 can suppress influence of the noise. The signal processing unit 44 compares the detected signal of the difference caused by the finger with a predetermined threshold voltage. If the signal of the difference is smaller than the threshold voltage, the signal processing unit 44 determines that an external proximity object is in the non-contact state. The signal processing unit 44 compares a detected digital voltage with a predetermined threshold voltage. If the digital voltage is equal to or larger than the threshold voltage, the signal processing unit 44 determines that an external proximity conductor is in the contact state. In this way, the touch detection unit 40 can perform touch detection.

The coordinate extracting unit 45 is a logic circuit that obtains, when a touch is detected by the signal processing unit 44, touch panel coordinates at which the touch is detected. The detection timing control unit 46 controls the A/D conversion unit 43, the signal processing unit 44, and the coordinate extracting unit 45 to operate in synchronization with one another. The coordinate extracting unit 45 outputs the touch panel coordinates as a detection signal output Vout.

Figure 7:
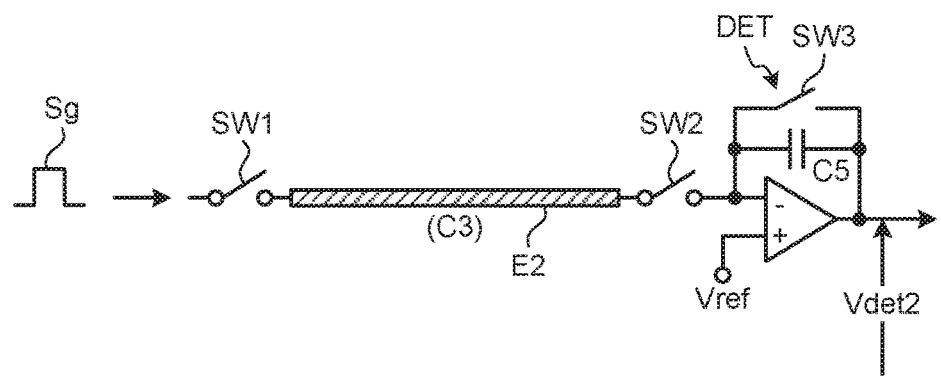
FIG. 7 is a diagram for explaining the basic principle of self-capacitance type touch detection, illustrating the state in which a finger is neither in contact with nor in proximity to the touch detection electrode.
Figure 8:
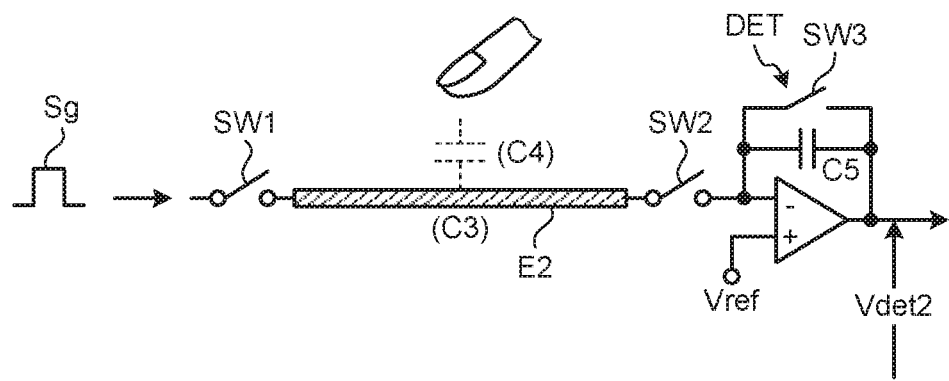
FIG. 8 is a diagram for explaining the basic principle of the self-capacitance type touch detection, illustrating the state in which a finger is in contact with or in proximity to the touch detection electrode.
Figure 9:
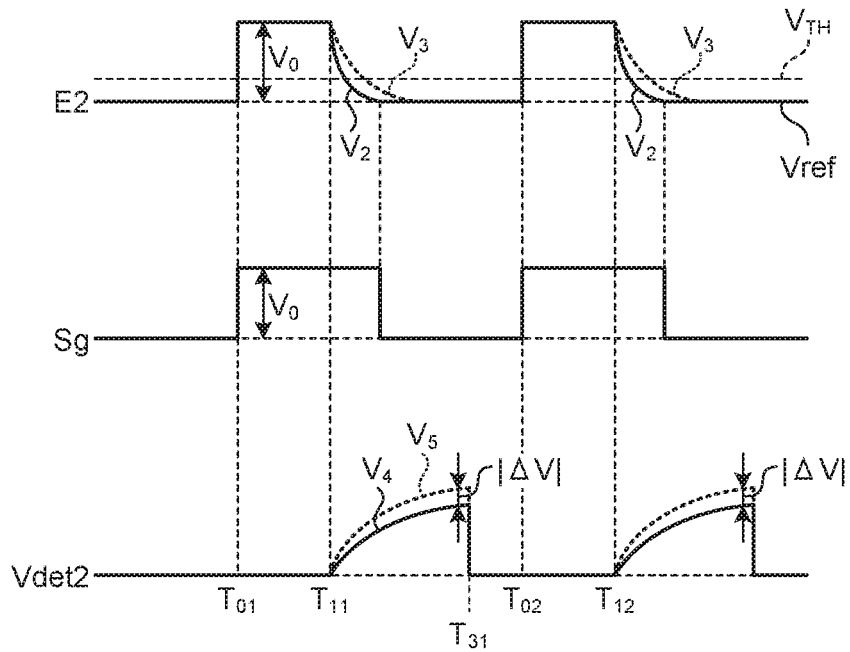
FIG. 9 is a diagram illustrating an example of waveforms of the drive signal and a touch detection signal of the self-capacitance type touch detection.

The following describes the basic principle of the self-capacitance type touch detection in the second touch detection mode of the display device 1 with a touch detection function according to the present embodiment, with reference to FIGS. 7 to 9. FIG. 7 is a diagram for explaining the basic principle of the self-capacitance type touch detection, illustrating the state in which the finger is neither in contact with nor in proximity to the touch detection electrode. FIG. 8 is a diagram for explaining the basic principle of the self-capacitance type touch detection, illustrating the state in which the finger is in contact with or in proximity to the touch detection electrode. FIG. 9 is a diagram illustrating an example of waveforms of the drive signal and the touch detection signal. FIGS. 7 and 8 also illustrate the detection circuit.

As illustrated in FIG. 7, in the state in which the finger is neither in contact with nor in proximity to the touch detection electrode, the AC rectangular wave Sg having a predetermined frequency (e.g., several kilohertz to several hundred kilohertz) is applied to the touch detection electrode E2. The touch detection electrode E2 has capacitance C3, and current corresponding to the capacitance C3 flows therein. The voltage detector DET converts a variation in the current corresponding to the AC rectangular wave Sg into a variation in voltage (waveform $V_2$ of a solid line in FIG. 9).

Then, as illustrated in FIG. 8, in the state in which the finger is in contact with or in proximity to the touch detection electrode, capacitance C4 generated between the finger and the touch detection point is added to the capacitance C3 of the touch detection electrode E2. Therefore, when the AC rectangular wave Sg is applied to the touch detection electrode E2, current corresponding to the capacitances C3 and C4 flows therein. As illustrated in FIG. 9, the voltage detector DET converts the variation in the current corresponding to the AC rectangular wave Sg into a variation in voltage (waveform $V_3$ of a dotted line). The obtained voltage values of the waveforms $V_2$ and $V_3$ are integrated and compared with each other so that whether the finger is in contact with or in proximity to the touch detection electrode E2 can be determined. A method of obtaining periods until the waveforms $V_2$ and $V_3$ in FIG. 9 are reduced to a predetermined reference voltage and comparing the periods with each other may be employed.

Specifically, as illustrated in FIGS. 7 and 8, the touch detection electrode E2 is configured to be disconnectable from a power source and the voltage detector DET by switches SW1 and SW2, respectively. In FIG. 9, the voltage level of the AC rectangular wave Sg increases to a voltage $V_0$ at time $T_{01}$. At this time, the switch SW1 is turned on, and the switch SW2 is turned off. As a result, the voltage of the touch detection electrode E2 also increases to the voltage $V_0$. The switch SW1 is then turned off before time $T_{11}$. At this time, the touch detection electrode E2 is brought into a floating state, but the potential of the touch detection electrode E2 is maintained at $V_0$ by the capacitance C3 of the touch detection electrode E2 (refer to FIG. 7) or by the capacitance (C3+C4) obtained by adding the capacitance C4 generated by the contact or proximity of the finger or the like to the capacitance C3 of the touch detection electrode E2 (refer to FIG. 8). In addition, a switch SW3 is turned on before time $T_{11}$ and turned off after a certain time elapses so as to reset the voltage detector DET. This reset operation changes the output voltage to a voltage substantially equal to Vref.

Subsequently, when the switch SW2 is turned on at time $T_{11}$, the voltage at an inverting input part of the voltage detector DET changes to the voltage $V_0$ of the touch detection electrode E2, and then the voltage at the inverting input part of the voltage detector DET is reduced to the reference voltage Vref according to a time constant of the capacitance C3 (or C3+C4) of the touch detection electrode E2 and that of capacitance C5 in the voltage detector DET. At this time, an electric charge stored in the capacitance C3 (or C3+C4) of the touch detection electrode E2 moves to the capacitance C5 in the voltage detector DET, so that the output (Vdet2) of the voltage detector DET increases. When the finger or the like is not in proximity to the touch detection electrode E2, the output (Vdet2) of the voltage detector DET forms a waveform $V_4$ indicated by a solid line, and is represented by Vdet2=C3·$V_0$/C5. When the capacitance generated by the influence of the finger or the like is added, the output (Vdet2) forms a waveform $V_5$ indicated by a dotted line, and is represented by Vdet2=(C3+C4·$V_0$/C5.

Then, at time T31 after the electric charge in the capacitance C3 (or C3+C4) of the touch detection electrode E2 has sufficiently moved to the capacitance C5, the switch SW2 is turned off, and the switches SW1 and SW3 are turned on so as to lower the potential level of the touch detection electrode E2 to the same potential level as that of the AC rectangular wave Sg and to reset the voltage detector DET. In this operation, the switch SW1 may be turned on at any time before time $T_{02}$ after the switch SW2 is turned off. The voltage detector DET may be reset at any time before time $T_{12}$ after the switch SW2 is turned off. The operation described above is repeated at the predetermined frequency (e.g., several kilohertz to several hundred kilohertz). Whether there is the external proximity object (whether there is a touch) can be determined based on the absolute value $|\Delta V|$ of the difference between the waveforms $V_4$ and $V_5$. As illustrated in FIG. 9, the potential of the touch detection electrode E2 forms the waveform $V_2$ when the finger or the like is not in proximity to the touch detection electrode E2, and forms the waveform $V_3$ when the capacitance C4 generated by the influence of the finger or the like is added. Whether there is the external proximity object (whether there is a touch) can also be determined by measuring the times until the waveforms $V_2$ and $V_3$ are reduced to a predetermined voltage $V_{TH}$.

In the touch panel 30 illustrated in FIG. 1, electric charges are supplied to a plurality of touch detection electrodes TDL (to be described below) according to a second drive signal Vx supplied from the touch detection electrode driver 102, and the self-capacitance type touch detection is performed.

The touch panel 30 outputs the second touch detection signal Vdet2 from the touch detection electrodes TDL (to be described below) via the voltage detector DET illustrated in FIGS. 7 and 8. The second touch detection signal Vdet2 is supplied to the touch detection control unit 100 of the touch detection unit 40.

The touch detection control unit 100 may include a touch detection signal amplification unit and an A/D conversion unit (not illustrated). The second touch detection signal Vdet2 output from the touch detection electrodes TDL is supplied from the touch detection control unit 100 to the signal processing unit 44. The signal processing unit 44 extracts only the difference voltage generated by the finger. The signal processing unit 44 compares the detected difference voltage generated by the finger with the predetermined threshold voltage, and determines that the external proximity object approaching from the outside is in the contact state if the difference voltage is the threshold voltage or higher, or determines that the external proximity object is in the non-contact state if the difference voltage is lower than the threshold voltage. The signal processing unit 44 supplies the information on whether the external conductor is in contact with or in proximity to the touch detection electrode to the touch detection control unit 100. In this manner, the touch detection unit 40 can perform the self-capacitance type touch detection in the second touch detection mode.

In the self-capacitance type touch detection, when detecting whether the external conductor is in contact with or in proximity to the touch detection electrode, the coordinate extracting unit 45 does not operate, and thus does not output Vout. In the self-capacitance type touch detection, when determining a certain gesture, for example, the coordinate extracting unit 45 may calculate the coordinates of the input position of the gesture, and may output Vout. The drive electrode driver 14 supplies the first drive signal Vcom to the drive electrodes COML, and the touch detection electrode driver 102 supplies the second drive signal Vx to the touch detection electrodes TDL. However, the embodiments are not limited to this configuration. A single driver may be provided to drive the electrodes such that the driver supplies the drive signal to the drive electrodes COML by coupling thereto during the mutual capacitance type touch detection operation, and supplies the drive signal to the touch detection electrodes TDL by coupling thereto only during the self-capacitance type touch detection operation.

Figure 10:
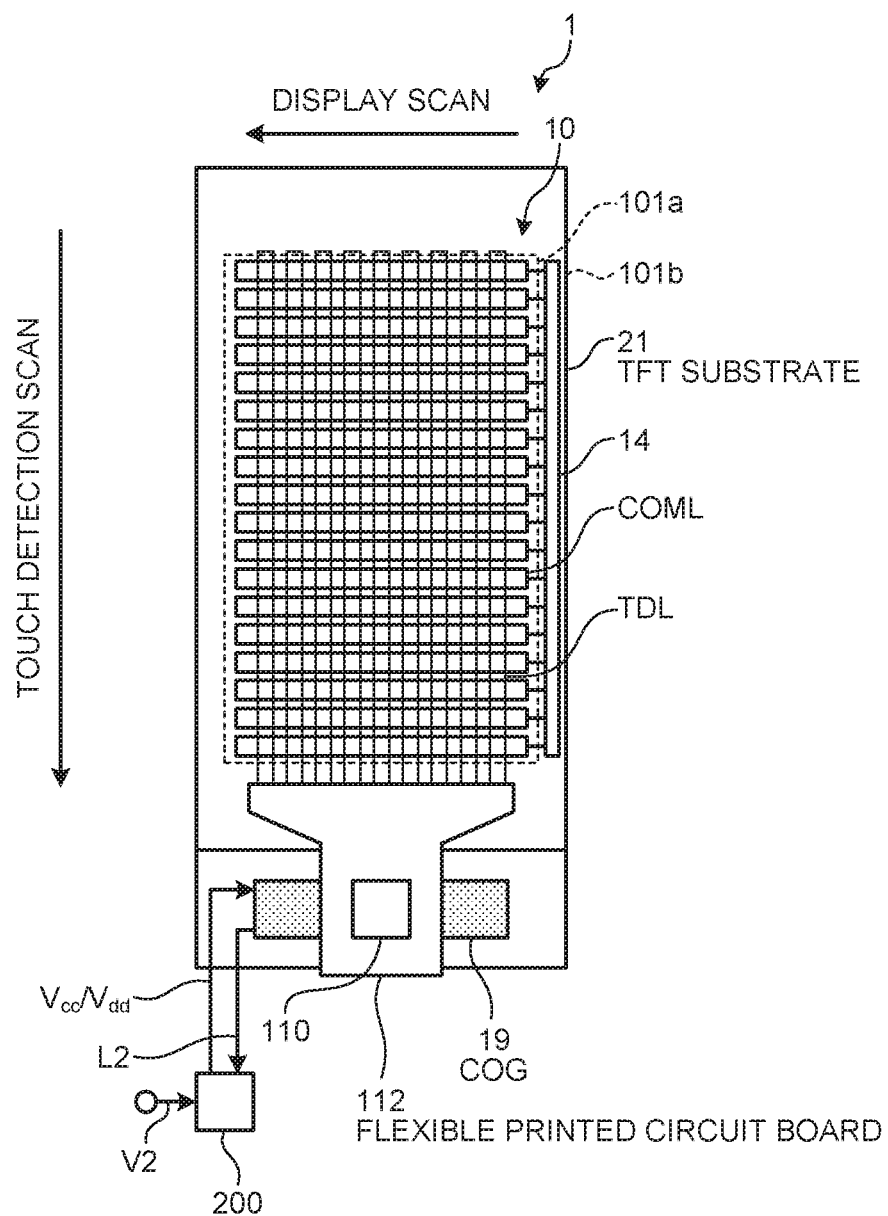
FIG. 10 is a plan view illustrating an example of a module with the display device with a touch detection function mounted thereon.

FIG. 10 is a plan view illustrating an example of a module with the display device with a touch detection function mounted thereon. As illustrated in FIG. 10, the display device 1 with a touch detection function includes a thin film transistor (TFT) substrate 21 and a flexible printed circuit board 112. On the TFT substrate 21, a chip on glass (COG) 19 is mounted, and a display region 101a of the display panel 20 (refer to FIG. 1) and a frame region 101b surrounding the display region 101a are formed. The COG 19 is a chip of an IC driver mounted on the TFT substrate 21, and incorporates circuits required for a display operation such as the control unit 11, the gate driver 12, and the source driver 13 illustrated in FIG. 1. According to the present embodiment, the drive electrode driver 14 may be formed on the TFT substrate 21 as a glass substrate. The COG 19 and the drive electrode driver 14 are arranged in the frame region 101b. The COG 19 may incorporate the drive electrode driver 14. In this case, the frame region 101b can be narrowed.

The COG 19 is coupled to a power supply circuit 200. The power supply circuit 200 is supplied with a power supply voltage $V_2$ from a battery, a main board of an electronic apparatus or the like, and uses a voltage booster circuit, a DC-to-DC converter or the like included in the power supply circuit to convert the power supply voltage $V_2$ to a certain voltage so as to generate a power supply voltage Vcc or Vdd. The power supply voltage Vcc or Vdd for driving the display unit 10 with a touch detection function is supplied from the power supply circuit 200 to the COG 19. The COG 19 supplies a control signal L2 for controlling the drive and stop of the power supply circuit 200. In the present embodiment, the power supply circuit 200 is disposed outside the module. However, the power supply circuit 200 may be disposed in the module, and may be mounted, for example, on the flexible printed circuit board 112.

The flexible printed circuit board 112 is provided on the short side of the display region 101a. A touch integrated circuit (IC) 110 is mounted on the flexible printed circuit board 112. The touch IC 110 includes the touch detection unit 40 (refer to FIG. 1). The touch IC 110 is coupled to the touch detection electrodes TDL arranged adjacent thereto, and the touch detection signals (first and second touch detection signals Vdet1 and Vdet2) are supplied to the touch IC 110. The flexible printed circuit board 112 is not limited to a flexible printed circuit board, but only needs to serve as a terminal. In such a case, the touch IC 110 is provided outside the module.

As illustrated in FIG. 10, in the display unit 10 with a touch detection function, the drive electrodes COML and the touch detection electrodes TDL are provided in an area overlapping the display region 101a of the display panel 20 (refer to FIG. 1). The drive electrodes COML and the touch detection electrodes TDL are formed so as to three-dimensionally cross each other in a direction orthogonal to a surface of the TFT substrate 21. The drive electrodes COML extend in a direction along the short side of the display region 101a. The touch detection electrodes TDL extend in a direction along the long sides of the display region 101a.

The display device 1 with a touch detection function illustrated in FIG. 10 outputs the first and second touch detection signals Vdet1 and Vdet2 from the short side of the display region 101a. This configuration facilitates routing of wiring for coupling the electrodes to the touch IC 110 via the flexible printed circuit board 112 serving as the terminal in the display device 1 with a touch detection function.

Figure 11:
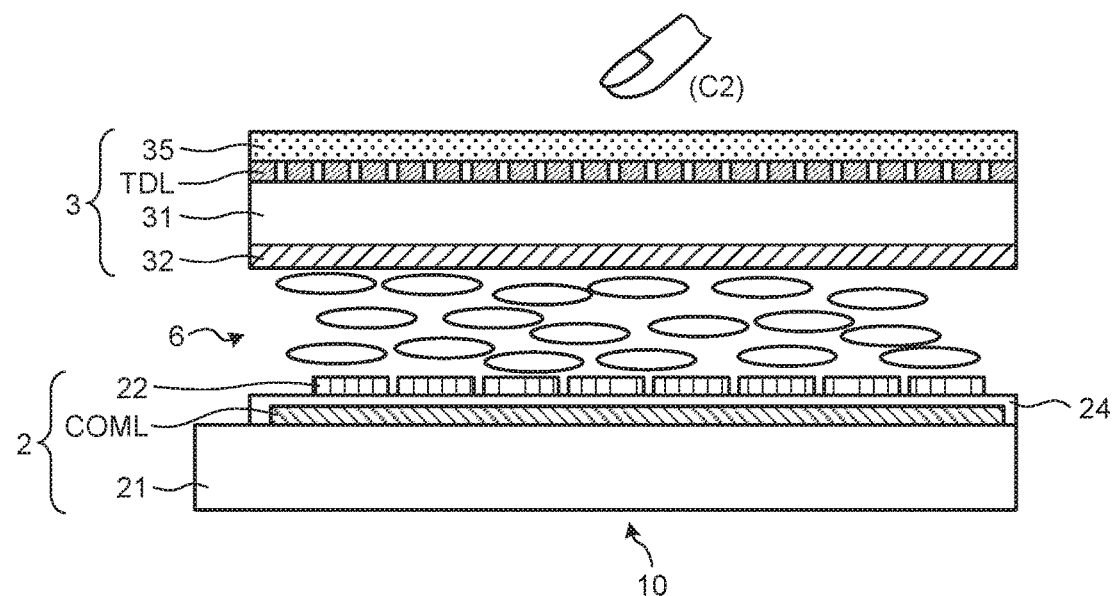
FIG. 11 is a cross-sectional view illustrating a schematic cross-sectional structure of the display device with a touch detection function according to the first embodiment.
Figure 12:
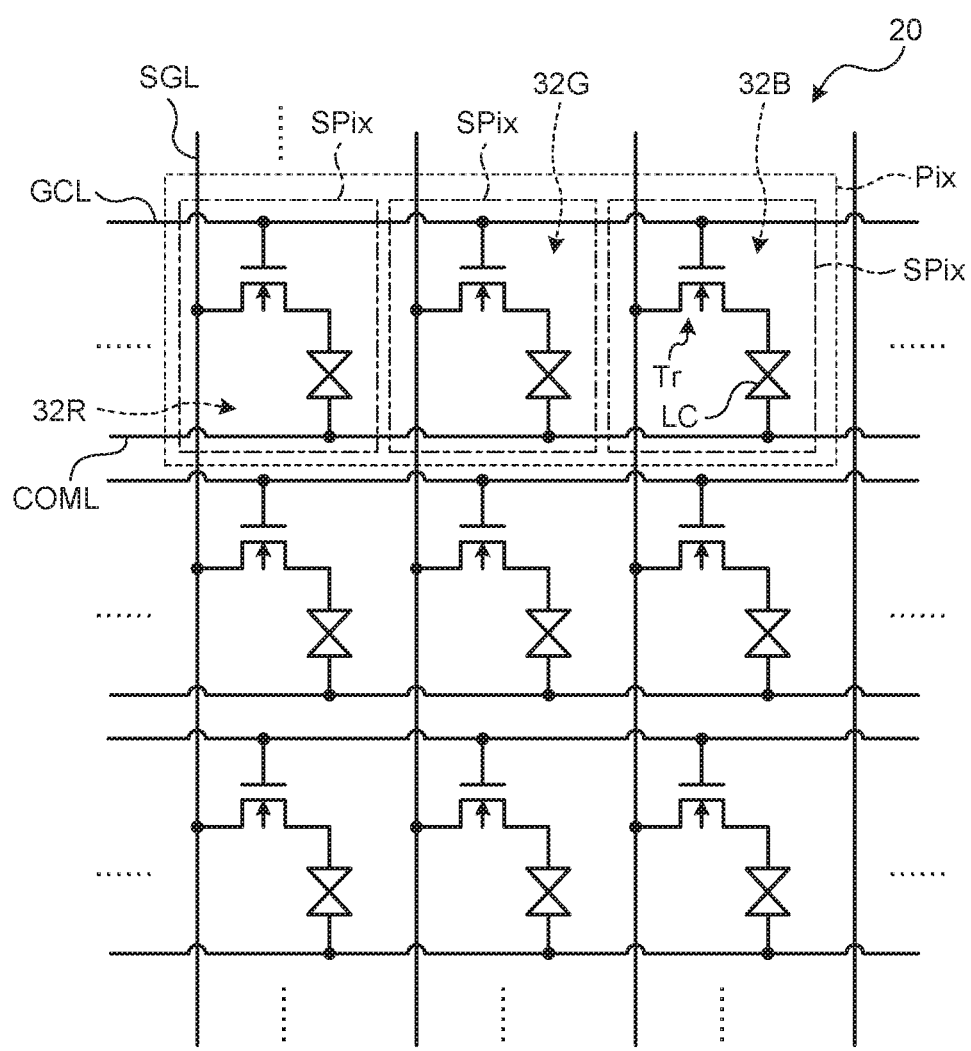
FIG. 12 is a circuit diagram illustrating a pixel array of a display unit with a touch detection function according to the first embodiment.

The following describes in detail a configuration example of the display unit 10 with a touch detection function. FIG. 11 is a cross-sectional view illustrating a schematic cross-sectional structure of the display unit with a touch detection function according to the first embodiment. FIG. 12 is a circuit diagram illustrating a pixel array of the display unit with a touch detection function according to the first embodiment.

As illustrated in FIG. 11, the display unit 10 with a touch detection function includes a pixel substrate 2, a counter substrate 3 arranged so as to face a surface of the pixel substrate 2 in the direction orthogonal thereto, and a liquid crystal layer 6 interposed between the pixel substrate 2 and the counter substrate 3. In light of protecting the display unit 10 with a touch detection function, a cover member (not illustrated) including, for example, a glass substrate and a light-shielding layer may be provided on the surface of the display unit 10 with a touch detection function.

The pixel substrate 2 includes the TFT substrate 21 serving as a circuit board, a plurality of pixel electrodes 22 arranged in a matrix above the TFT substrate 21, a plurality of drive electrodes COML formed between the TFT substrate 21 and the pixel electrode 22, and an insulating layer 24 that insulates the pixel electrode 22 from the drive electrode COML.

The counter substrate 3 includes a glass substrate 31 and a color filter 32 formed on one surface of the glass substrate 31. The touch detection electrodes TDL serving as detection electrodes of the touch panel 30 are formed on the other surface of the glass substrate 31, and a polarizing plate 35 is further provided on the touch detection electrodes TDL.

The liquid crystal layer 6 modulates light passing therethrough depending on a state of an electric field. For example, a display panel including liquid crystals of lateral electric-field mode such as in-plane switching (IPS) including fringe field switching (FFS) is used. An orientation film may be arranged between the liquid crystal layer 6 and the pixel substrate 2, and between the liquid crystal layer 6 and the counter substrate 3 illustrated in FIG. 11.

On the TFT substrate 21 illustrated in FIG. 11, there are formed a thin film transistor element (hereinafter, referred to as a TFT element) Tr of each sub-pixel SPix illustrated in FIG. 12, and wiring such as the pixel signal line SGL that supplies the pixel signal Vpix to each pixel electrode 22 and the scanning signal line GCL that drives each TFT element Tr. The pixel signal line SGL and the scanning signal line GCL extend along a plane parallel with the surface of the TFT substrate 21.

The display panel 20 illustrated in FIG. 12 includes a plurality of sub-pixels SPix arranged in a matrix. Each sub-pixel SPix includes the TFT element Tr and a liquid crystal element LC. The TFT element Tr is constituted of a thin film transistor. In this example, the TFT element Tr is constituted of an n-channel metal oxide semiconductor (MOS) TFT. One of a source and a drain of the TFT element Tr is coupled to the pixel signal line SGL, a gate thereof is coupled to the scanning signal line GCL, and the other one of the source and the drain thereof is coupled to one end of the liquid crystal element LC. One end of the liquid crystal element LC is coupled to the other one of the source and the drain of the TFT element Tr, and the other end thereof is coupled to the drive electrode COML.

The sub-pixel SPix is coupled to the other sub-pixel SPix belonging to the same row in the display panel 20 via the scanning signal line GCL. The scanning signal line GCL is coupled to the gate driver 12 (refer to FIG. 1), and receives the scanning signal Vscan supplied from the gate driver 12. The sub-pixel SPix is coupled to the other sub-pixel SPix belonging to the same column in the display panel 20 via the pixel signal line SGL. The pixel signal line SGL is coupled to the source driver 13 (refer to FIG. 1), and receives the pixel signal Vpix supplied from the source driver 13. The sub-pixel SPix is further coupled to the other sub-pixel SPix belonging to the same row via the drive electrode COML. The drive electrode COML is coupled to the drive electrode driver 14 (refer to FIG. 1), and receives the first drive signal Vcom supplied from the drive electrode driver 14. That is, in this example, a plurality of sub-pixels SPix belonging to the same row share one drive electrode COML.

The gate driver 12 illustrated in FIG. 1 drives the scanning signal line GCL to sequentially perform scanning. The scanning signal Vscan (refer to FIG. 1) is applied to a gate of the TFT element Tr of the sub-pixel SPix via the scanning signal line GCL, and one horizontal line of the sub-pixels SPix is sequentially selected as the display driving target. In the display device 1 with a touch detection function, the source driver 13 supplies the pixel signal Vpix to the sub-pixels SPix belonging to one horizontal line to perform display for each horizontal line. In performing this display operation, the drive electrode driver 14 applies the first drive signal Vcom to the drive electrode COML corresponding to the one horizontal line.

In the color filter 32 illustrated in FIG. 11, color regions colored in, for example, three colors, i.e., red (R), green (G), and blue (B) are periodically arranged, and color regions 32R, 32G, and 32B of R, G, and B are associated with the respective sub-pixels illustrated in FIG. 12, and one set of these regions constitutes a pixel Pix. The color filter 32 faces the liquid crystal layer 6 in the direction orthogonal to the TFT substrate 21. The color filter 32 may have a combination of other colors as long as being colored in different colors. The color filter 32 is not limited to having a combination of three colors, but may have a combination of four or more colors.

Figure 13:
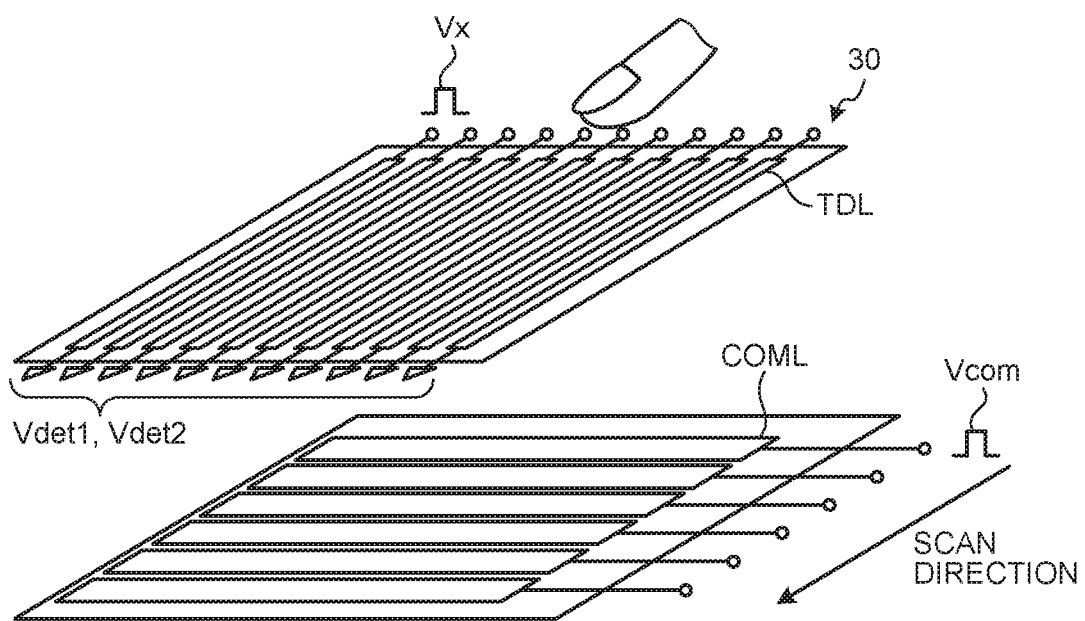
FIG. 13 is a perspective view illustrating a configuration example of drive electrodes and touch detection electrodes of the display unit with a touch detection function according to the first embodiment.

The drive electrodes COML according to the present embodiment serve as common electrodes for applying a common potential to the pixels of the display panel 20, and also serve as drive electrodes for performing the mutual capacitance type touch detection on the touch panel 30. The drive electrodes COML may serve as detection electrodes for performing the self-capacitance type touch detection. FIG. 13 is a perspective view illustrating a configuration example of the drive electrodes and the touch detection electrodes of the display unit with a touch detection function according to the first embodiment. The touch panel 30 includes the drive electrodes COML provided in the pixel substrate 2 and the touch detection electrodes TDL provided in the counter substrate 3.

The drive electrodes COML are divided into a plurality of stripe-like electrode patterns extending in the lateral direction of FIG. 13. The touch detection electrodes TDL are composed of stripe-like electrode patterns extending in a direction intersecting the extending direction of the electrode patterns of the drive electrodes COML. The touch detection electrodes TDL face the drive electrodes COML in the direction orthogonal to the surface of the TFT substrate 21 (refer to FIG. 11). Each of the electrode patterns of the touch detection electrodes TDL is coupled to input terminals of the touch detection signal amplification unit 42 and the touch detection control unit 100 of the touch detection unit 40, and is also coupled to an output terminal of the touch detection electrode driver 102 (refer to FIG. 1). The electrode patterns formed by the drive electrodes COML and the touch detection electrodes TDL intersecting each other generate electrostatic capacitances at intersecting portions therebetween.

For example, a translucent conductive material such as indium tin oxide (ITO) is used for the touch detection electrodes TDL and the drive electrode COML. The shape of the touch detection electrode TDL or the drive electrode COML (drive electrode block) is not limited to the shape of stripes divided into a plurality of portions. The touch detection electrode TDL and the drive electrode COML may have a comb-teeth shape, for example. Alternatively, the touch detection electrode TDL and the drive electrode COML only need to be divided into a plurality of portions, and a slit that divides the drive electrode COML may have a linear shape or a curved shape.

With this configuration, when the touch panel 30 performs a mutual capacitance touch detection operation, the drive electrode driver 14 drives the drive electrode COML to sequentially perform scanning in a time division manner as a drive electrode block, so that one detection block of the drive electrode COML is sequentially selected. When the first touch detection signal Vdet1 is output from the touch detection electrode TDL, touch detection for one detection block is performed. In other words, the drive electrode block corresponds to the drive electrode E1 in the basic principle of the capacitance touch detection described above, and the touch detection electrode TDL corresponds to the touch detection electrode E2. The touch panel 30 thus detects a touch input in accordance with the basic principle. As illustrated in FIG. 13, in the touch panel 30, the touch detection electrodes TDL and the drive electrodes COML intersecting with each other constitute capacitance touch sensors in a matrix. Thus, by scanning the entire touch detection surface of the touch panel 30, a position where an external proximity conductor is brought into contact with or proximity to the touch panel 30 can be detected.

When the touch panel 30 performs the self-capacitance type touch detection, the second drive signals Vx are supplied to the touch detection electrodes TDL, and the second touch detection signals Vdet2 are output from the touch detection electrodes TDL. When a user brings the finger or the like into contact with or proximity to the display region of the touch panel 30 in the sleep mode, an electrostatic capacitance is generated between the finger or the like and the touch detection electrodes TDL, so that the self-capacitance of the touch detection electrodes TDL changes. In this manner, the contact or proximity of the external conductor, such as the finger, can be detected. The touch detection electrodes TDL correspond to the touch detection electrode E2 in the above-described basic principle of the self-capacitance type touch detection. The touch panel 30 detects the touch input according to this basic principle. In the self-capacitance type touch detection, the touch detection electrode driver 102 may simultaneously supply the second drive signals Vx to the touch detection electrodes TDL, or may supply the second drive signals Vx to the touch detection electrodes TDL in a time-division manner by sequentially selecting each of the touch detection electrodes TDL.

Figure 14:
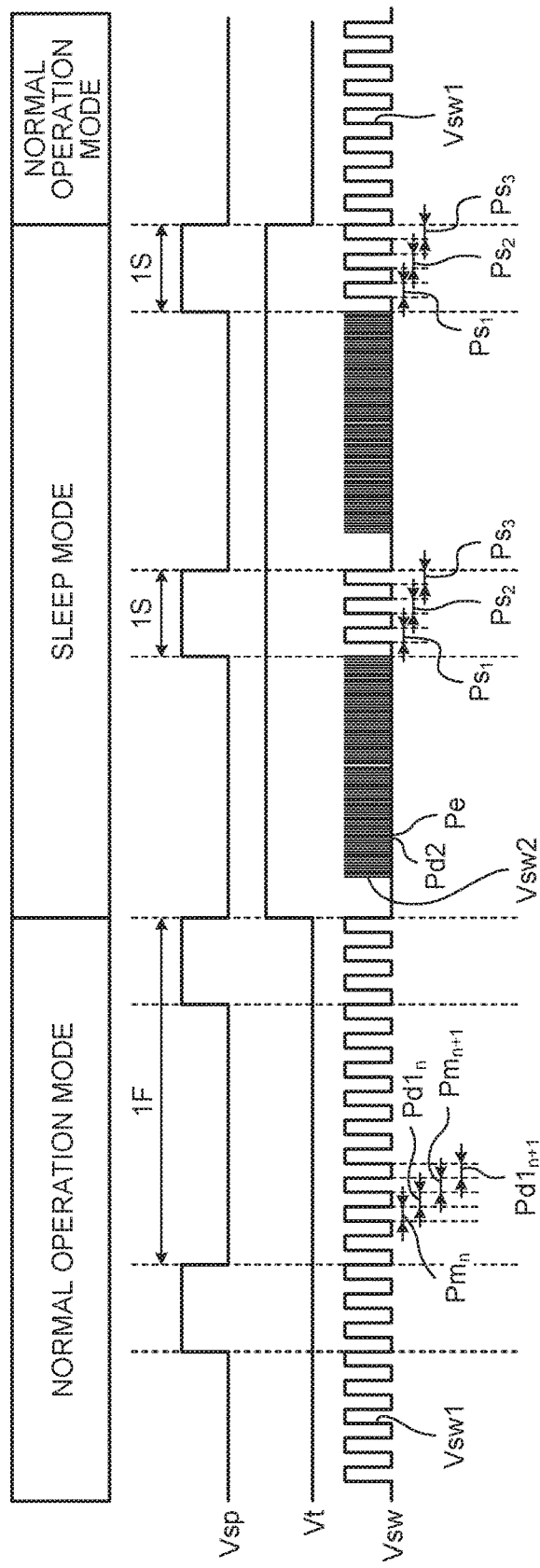
FIG. 14 is a timing waveform diagram illustrating an operation example of the display device with a touch detection function according to the first embodiment in a normal operation mode and in a sleep mode.
Figure 15:
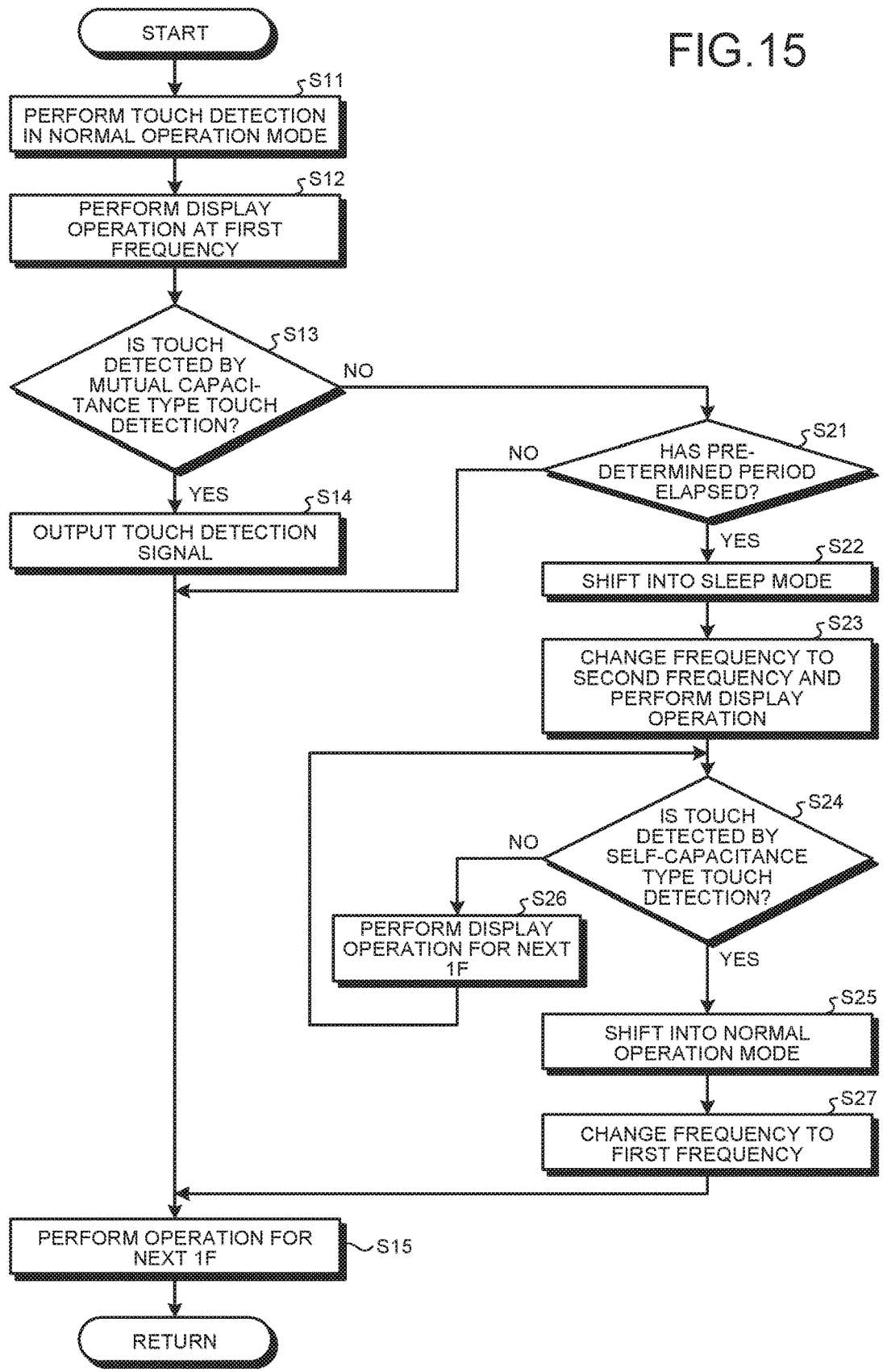
FIG. 15 is a flowchart illustrating a display operation and a touch detection operation of the display device with a touch detection function according to the first embodiment.

The following describes in detail the operations of the display device 1 with a touch detection function. FIG. 14 is a timing waveform diagram illustrating an operation example of the display device with a touch detection function according to the first embodiment in the normal operation mode and in the sleep mode. FIG. 15 is a flowchart illustrating the display operation and the touch detection operation of the display device with a touch detection function according to the first embodiment.

As illustrated in FIG. 14, the display device 1 with a touch detection function has the normal operation mode and the sleep mode. In the normal operation mode, a first touch detection period $Pm_n$ (n=1, 2, . . . ) and a first display period $Pd1_n$ (n=1, 2, . . . ) are alternately arranged in a time-division manner in one frame period. The display device 1 with a touch detection function performs the first touch detection operation by the mutual capacitance method in the first touch detection period $Pm_n$ (Step S11 in FIG. 15), and performs the display operation for the video information for one frame in the first display period $Pd1_n$ (Step S12 in FIG. 15).

A detection period control signal Vsp illustrated in FIG. 14 is a signal for setting a period of the self-capacitance type touch detection in the sleep mode. The detection period control signal Vsp may be a signal synchronized with a vertical synchronization signal (not illustrated) for setting a period of the display operation for image information for one frame. In this case, the period of one frame (1 F) is synchronized with timing of supplying the detection period control signal Vsp, as illustrated in FIG. 14. The detection period control signal Vsp is not limited to the above, but may be a signal having a frequency different from that of the vertical synchronization signal.

A switching control signal Vsw is a control signal for switching between a display operation period for performing the display operation and a display stop period for stopping the display operation. The switching control signals Vsw include a first switching control signal Vsw1 in the normal operation mode and a second switching control signal Vsw2 in the sleep mode. The first switching control signal Vsw1 includes periodic pulse signals at a first frequency. The second switching control signal Vsw2 includes periodic pulse signals at a second frequency different from the first frequency. As illustrated in FIG. 14, a period in which the first switching control signal Vsw1 is activated corresponds to the first touch detection period $Pm_n$ (n=1, 2, . . . ) in which the display operation is stopped and the touch detection operation is performed, and a period in which the first switching control signal Vsw1 is deactivated corresponds to the first display period $Pd1_n$ (n=1, 2, . . . ). The switching control signal Vsw may be, for example, a signal synchronized with a horizontal synchronization signal (not illustrated) for controlling the display operation period for one horizontal line.

In the normal operation mode, the control unit 11 supplies the first switching control signal Vsw1 having the first frequency to the gate driver 12, the source driver 13, and the drive electrode driver 14. In the normal operation mode, the display operation and the first touch detection operation are performed in a time-division manner at the first frequency based on the first switching control signal Vsw1. The first frequency is, for example, in the range of several kilohertz to 10 kilohertz.

In each of the first display periods $Pd1_n$ (n=1, 2, . . . ), the display operation is sequentially performed for one horizontal line based on data obtained by dividing the video information for one frame into N pieces. The memory 11a illustrated in FIG. 1 writes and reads each 1/N piece of data of the video information for one frame, and supplies the pixel signals Vpix for the 1/N piece of data to the source driver 13. The memory 11a reads the 1/N piece of data in a period shorter than a period for writing it. As a result, the display device with a touch detection function can shorten the period for performing the display operation so as to have the period for performing the display operation and the period for not performing the display operation in a time-division manner. The period for performing the display operation corresponds to the first display period $Pd1_n$ (n=1, 2, . . . ). The display device 1 with a touch detection function performs the first touch detection operation in the display stop operation period for stopping the display operation, and thus can ensure the first touch detection period $Pm_n$ (n=1 to N). One horizontal display period is repeated in one first display period $Pd1_n$, and the display operation is performed for the 1/N piece of image information obtained by dividing the video information for one frame into N pieces as described above.

The display device 1 with a touch detection function performs the first touch detection operation in the first touch detection period $Pm_n$. The first touch detection operation is the mutual capacitance type touch detection based on the mutual capacitance between the touch detection electrodes TDL and the drive electrodes COML. The first touch detection signal Vdet1 output from the touch detection electrodes TDL is supplied to the touch detection signal amplification unit 42 of the touch detection unit 40. The touch detection signal amplification unit 42 amplifies and then outputs the first touch detection signal Vdet1. The A/D conversion unit 43 converts the analog signals output from the touch detection signal amplification unit 42 into the digital signals at timing synchronized with the first drive signals Vcom. The signal processing unit 44 detects whether there is a touch on the touch panel 30 based on the output signal of the A/D conversion unit 43 (Step S13 in FIG. 15).

If the signal processing unit 44 determines that a touch is detected by the mutual capacitance type touch detection (Yes at Step S13 in FIG. 15), the coordinate extracting unit 45 calculates the touch panel coordinates, and outputs the touch panel coordinates as the detection signal output Vout (Step S14 in FIG. 15). Then, the display operation and the first touch detection operation in the next one frame period (1 F) are performed (Step S15 in FIG. 15).

If the signal processing unit 44 determines that no touch is detected (No at Step S13 in FIG. 15), the touch detection control unit 100 receives the information from the signal processing unit 44, and determines whether the predetermined period has elapsed without a touch input (Step S21 in FIG. 15). If the predetermined period has not elapsed (No at Step S21 in FIG. 15), the touch detection control unit 100 continues the normal operation mode, and performs the display operation and the first touch detection operation in the next one frame period (1 F). If the predetermined period has elapsed without a touch input (Yes at Step S21 in FIG. 15), the touch detection control unit 100 activates the operation mode control signal Vt, and outputs it to the control unit 11. Thus, the display device 1 with a touch detection function shifts into the sleep mode (Step S22 in FIG. 15).

In the sleep mode, the control unit 11 stops the first touch detection operation of the touch panel 30. The control unit 11 changes the first switching control signal Vsw1 to the second switching control signal Vsw2 having the second frequency different from the first frequency, and supplies the second switching control signal Vsw2 to the gate driver 12, the source driver 13, and the drive electrode driver 14. As illustrated in FIG. 14, in the sleep mode of the display device 1 with a touch detection function, there are alternately provided a second display period $Pd2_n$ (n=1, 2, . . . ) for performing the display operation and a display stop period $Pe_n$ (n=1 to $N_2$) for stopping the display operation.

In the sleep mode, the display operation and the display stop operation are performed in a time-division manner at the second frequency different from the first frequency based on the second switching control signal Vsw2 (Step S23 in FIG. 15). In the present embodiment, the control unit 11 sets the second frequency to a frequency higher than the first frequency and outside a human audible range. The human audible frequency range is a frequency range higher than 20 Hz and lower than 20 kHz. In the present embodiment, the second frequency is, for example, 20 kHz or higher.

In each of the second display periods $Pd2_n$ (n=1, 2, . . . ), the display operation is sequentially performed for one horizontal line based on data obtained by dividing the video information for one frame into N' pieces. The memory IIa illustrated in FIG. 1 writes and reads each 1/N' piece of data of the video information for one frame, and supplies the pixel signals Vpix for the 1/N' piece of data to the source driver 13.

In the display stop period $Pe_n$ (n=1, 2, . . . ), the first touch detection operation stops, and the mutual capacitance type touch detection is not performed, so that the touch detection unit 40 stops operating. Accordingly, the power consumption of the display device 1 with a touch detection function decreases. The limitation by, for example, the touch IC 110 (refer to FIG. 10) is reduced, and thus the degree of freedom of the second frequency in the sleep mode increases.

The power supply circuit 200 (refer to FIG. 10) for supplying the power supply voltage to the display device 1 with a touch detection function includes electronic components, such as a capacitor, so that the vibration of the electronic components generates noise when the power supply circuit 200 is continuously driven at a frequency in the human audible frequency range in some cases. The display device 1 with a touch detection function of the present embodiment can use the sleep mode for not performing the first touch detection operation to set the second frequency of the second switching control signal Vsw2 to a frequency (such as 20 kHz) outside the human audible range. Specifically, a frequency at which the display operation (second display period $Pd2_n$) and the display stop operation (display stop period $Pe_n$) are time-divisionally performed is set to a frequency outside the human audible range. This prevents, for example, the power supply circuit 200 from being continuously driven at a frequency in the audible range, and thus can reduce the noise.

As illustrated in FIG. 14, in the sleep mode, the detection period control signal Vsp is activated after the display operation of one frame is completed. In the period in which the detection period control signal Vsp is activated, the display operation is not controlled by the second switching control signal Vsw2, so that the display operation is not performed. The period in which the detection period control signal Vsp is activated is a touch detection period (1 S) for performing the self-capacitance type touch detection in the sleep mode. Second touch detection periods $Ps_1$ to $Ps_3$ are provided in the touch detection period (1 S). The display device 1 with a touch detection function performs the second touch detection operation in the second touch detection periods $Ps_1$ to $Ps_3$. In the second touch detection operation, the self-capacitance type touch detection is performed to detect whether the external conductor such as a finger is in contact with or in proximity to the display region, based on the self-capacitance of the touch detection electrodes TDL (Step S24 in FIG. 15). The second touch detection operation is performed a plurality of times at the same frequency as the first frequency in the normal operation mode. In the present embodiment, the second touch detection operation is performed three times in the period in which the detection period control signal Vsp is activated. However, the number of times of the second touch detection operation is not limited to three. The second touch detection operation only needs to be performed at least once in one frame period, and may be performed three or more times.

If the contact or proximity of the external conductor is not detected by the second touch detection operation (No at Step S24 in FIG. 15), the touch detection control unit 100 keeps the operation mode control signal Vt in the activated state. The display device 1 with a touch detection function continues the sleep mode, and performs the display operation of the next one frame (Step S26 in FIG. 15). If the contact or proximity of the external conductor is detected by the second touch detection operation (Yes at Step S24 in FIG. 15), the touch detection control unit 100 deactivates the operation mode control signal Vt and outputs it to the control unit 11, and the display device 1 with a touch detection function shifts into the normal operation mode (Step S25 in FIG. 15). The control unit 11 changes the second switching control signal Vsw2 having the second frequency to the first switching control signal Vsw1 having the first frequency to switch a frequency of performing the display operation and the display stop operation in a time-division manner from the second frequency to the first frequency (Step S27 in FIG. 15). The display operation in the first display period $Pd1_n$ (n=1, 2, . . . ) and the first touch detection operation in the first touch detection period $Pm_n$ are performed in a time-division manner.

As described above, if no touch input is detected for a certain period, the display device 1 with a touch detection function shifts into the sleep mode to stop the first touch detection operation, so that the power consumption can be reduced. In the sleep mode, the first touch detection operation is not performed, so that the limitation by the touch detection unit 40 and the touch IC 110 (refer to FIG. 10) is reduced, and thus the second frequency can be easily changed. The drive frequency of the display panel 20 and the touch panel 30 of the display device 1 with a touch detection function is changed at least in the period of the sleep mode. This prevents, for example, the power supply circuit 200 (refer to FIG. 10) from being driven at a frequency in the audible range, and thus can reduce the noise.

Figure 16:
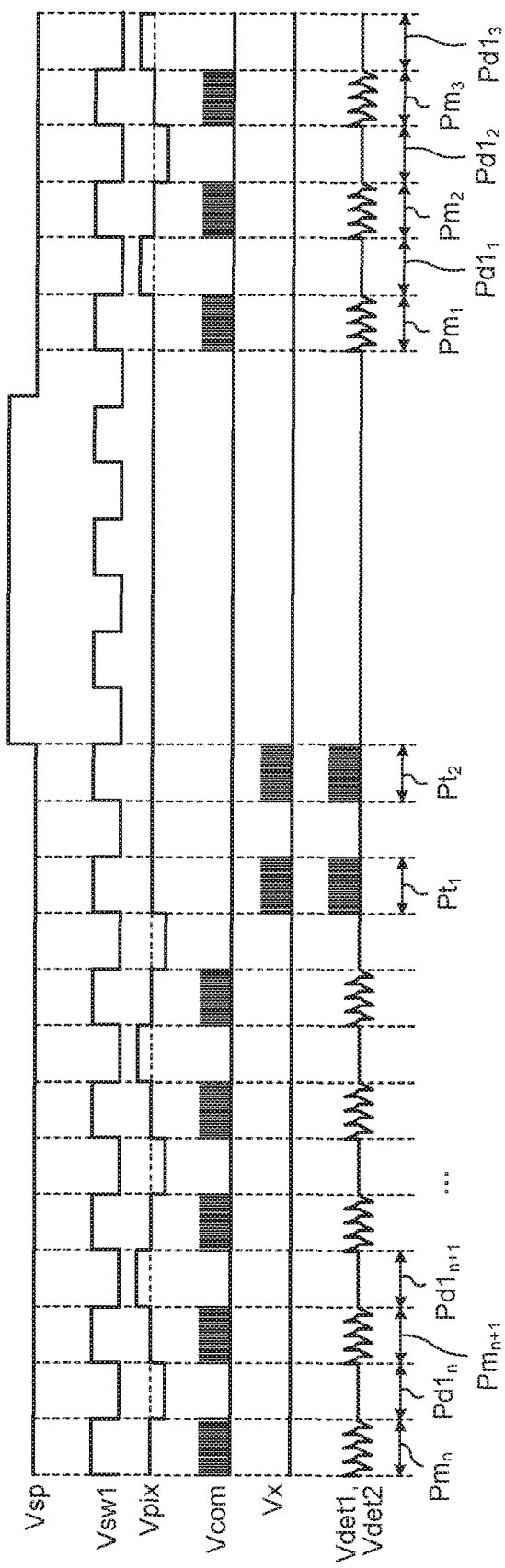
FIG. 16 is a timing waveform diagram illustrating the operation example in the normal operation mode illustrated in FIG. 14.

The following describes in detail the operation example in the normal operation mode with reference to FIGS. 1, 12, and 16. FIG. 16 is a timing waveform diagram illustrating the operation example in the normal operation mode illustrated in FIG. 14. The display device 1 with a touch detection function has the first touch detection period $Pm_n$ (n=1, 2, . . . ) for performing the first touch detection operation and the first display period $Pd1_n$ (n=1, 2, . . . ) for performing the display operation in a time-division manner for each horizontal display period (1 H).

First, when the first switching control signal Vsw1 is activated (to a high voltage level), the first touch detection period $Pm_n$ starts. In the first touch detection period $Pm_n$, the drive electrode driver 14 applies the first drive signal Vcom to a drive electrode COML at the n-th row, and the first drive signal Vcom changes from a low voltage level to the high voltage level. The first drive signal Vcom is transmitted to the touch detection electrodes TDL via the electrostatic capacitance, and the first touch detection signal Vdet1 changes. When the first drive signal Vcom subsequently changes from the high voltage level to the low voltage level, the first touch detection signal Vdet1 changes in the same manner. The waveform of the first touch detection signal Vdet1 in the first touch detection period $Pm_n$ corresponds to that of the first touch detection signal Vdet1 in the basic principle of the mutual capacitance type touch detection described above. The A/D conversion unit 43 performs analog-to-digital conversion on the first touch detection signal Vdet1 in the first touch detection period $Pm_n$ (n=1, 2, . . . ), and thus the touch detection is performed. In this manner, the display device 1 with a touch detection function performs the touch detection for one detection line.

When the first switching control signal Vsw1 is deactivated (to the low voltage level), the first display period $Pd1_n$ starts. When the first switching control signal Vsw1 is deactivated (to the low voltage level), the gate driver 12 applies a scan signal Vscan to a scan signal line GCL at the n-th row, and the scan signal Vscan of the scan signal line GCL at the n-th row is activated (to the high voltage level). In the first display period $Pd1_n$, the source driver 13 applies the pixel signals Vpix to the pixel signal lines SGL, and thus the display for one horizontal line is performed. The change in the pixel signals Vpix is transmitted to the touch detection electrodes TDL via parasitic capacitance, which may change the first touch detection signal Vdet1. However, influence by the change in the pixel signals Vpix on the touch detection can be prevented by the A/D conversion unit 43 not performing the A/D conversion in the first display period $Pd1_n$. After the source driver 13 completes supplying the pixel signals Vpix, the gate driver 12 deactivates the scan signal Vscan of the scan signal line GCL at the first row (to the low voltage level), and thus, one horizontal display period ends. This horizontal display period is sequentially repeated, and thus, the display operation is performed for the 1/N piece of image information.

When the first switching control signal Vsw1 is activated (to the high voltage level), the first touch detection period $Pm_{n+1}$ starts, and the first touch detection operation is performed for the next detection line. When the first switching control signal Vsw1 is deactivated (to the low voltage level), the first display period $Pd1_{n+1}$ starts. In this manner, the display operation in the next one horizontal display period (1 H) is performed. By repeating this operation, the display device 1 with a touch detection function performs the display operation by scanning the entire display surface in the first display period $Pd1_n$ (n=1, 2, . . . ), and also performs the first touch detection operation by scanning the entire touch detection surface in the first touch detection period $Pm_n$ (n=1, 2, . . . ).

In the first display period $Pd1_n$ (n=1, 2, . . . ), the drive electrode driver 14 applies the first drive signal Vcom as a drive signal for display to the selected drive electrode COML. In this example, a direct-current (DC) voltage of 0 V is supplied in the first display period $Pd1_n$ (n=1, 2, . . . ).

Specifically, in this example, the first drive signal Vcom as a touch drive signal is a rectangular wave signal having a low-voltage level part and a high-voltage level part, and the drive signal for display is a DC voltage signal at the same voltage level as that of the low-voltage level part of the touch drive signal.

The drive electrode driver 14 applies the DC voltage signal at the same voltage level as that of the drive signal for display in the period in which the drive electrode COML is not selected by the gate driver 12. However, the drive electrodes COML may be in a floating state where no voltage signal is applied and the potential thereof is not fixed.

As illustrated in FIG. 16, the display device 1 with a touch detection function of the present embodiment performs dot-inversion driving, so that the pixel signal Vpix applied by the source driver 13 is reversed in polarity from that in the previous one horizontal display period (1 H).

As illustrated in FIG. 16, third touch detection periods $Pt_1$ and $Pt_2$ may be provided after the end of the first touch detection period $Pm_n$ (n=1, 2, . . . ) and the first display period $Pd1_n$ (n=1, 2, . . . ). In each of the third touch detection periods $Pt_1$ and $Pt_2$, a third touch detection operation is performed by the self-capacitance method. In each of the third touch detection periods $Pt_1$ and $Pt_2$, the touch detection electrode driver 102 supplies the second drive signal Vx to the touch detection electrodes TDL, and the second touch detection signal Vdet2 is output from the touch detection electrodes TDL. The touch detection control unit 100 detects the contact or proximity of the conductor, such as a finger, based on the second touch detection signal Vdet2. If the contact or proximity of the conductor such as a finger is not detected for the predetermined period, the touch detection control unit 100 may activate the operation mode control signal Vt (to the high voltage level) and output it to shift the display device 1 with a touch detection function into the sleep mode. The third touch detection operation can also detect an input to, for example, a button part (not illustrated) provided separately from the display region.

Figure 17:
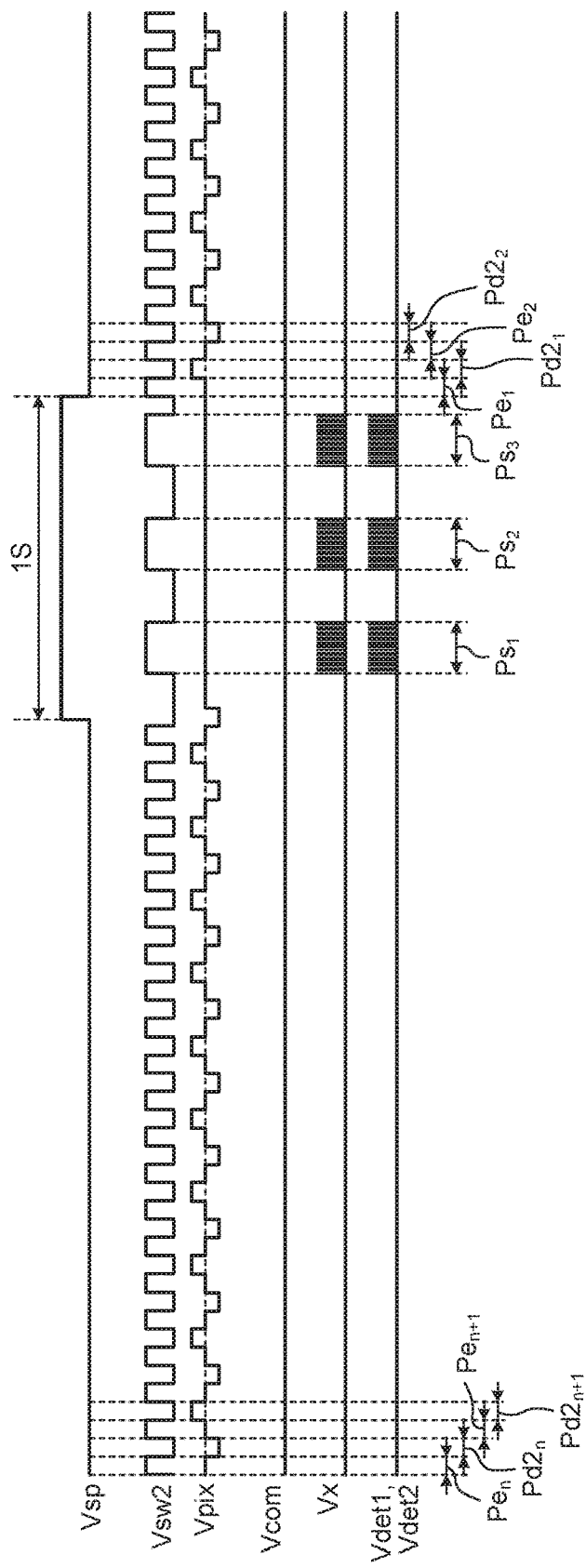
FIG. 17 is a timing waveform diagram illustrating the operation example in the sleep mode illustrated in FIG. 14.

The following describes in detail the operation example in the sleep mode with reference to FIGS. 1, 12, and 17. FIG. 17 is a timing waveform diagram illustrating the operation example in the sleep mode illustrated in FIG. 14. In the sleep mode, the display device 1 with a touch detection function has the second display period $Pd2_n$ (n=1, 2, . . . ) for performing the display operation and the display stop period $Pe_n$ (n=1, 2, . . . ) for performing the display stop operation of stopping the display operation in a time-division manner for each horizontal display period (1 H). In the sleep mode, the display operation and the display stop operation are performed in a time-division manner at the second frequency higher than the first frequency for the normal operation mode.

When the second switching control signal Vsw2 is activated (to the high voltage level), the display stop period $Pe_n$ for not performing the display operation starts. In the display stop period $Pe_n$, the first touch detection operation with the mutual capacitance method is not performed. Specifically, the touch detection unit 40 and the drive electrode driver 14 do not operate, so that the first drive signal Vcom is not applied to the drive electrodes COML.

When the second switching control signal Vsw2 is deactivated (to the low voltage level), the second display period $Pd2_n$ starts. When the second switching control signal Vsw2 is deactivated (to the low voltage level), the gate driver 12 applies the scan signal Vscan to the scan signal line GCL at the n-th row, and the scan signal Vscan of the scan signal line GCL at the n-th row is activated (to the high voltage level). In the second display period $Pd2_n$, the source driver 13 applies the pixel signals Vpix to the pixel signal lines SGL, and thus the display for one horizontal line is performed. After the source driver 13 completes supplying the pixel signals Vpix, the gate driver 12 deactivates the scan signal Vscan of the scan signal line GCL at the n-th row (to the low voltage level), and thus, one horizontal display period (1 H) ends.

In the second display period $Pd2_n$ (n=1, 2, . . . ), the drive electrode driver 14 applies a DC voltage of 0 V to the selected drive electrode COML. In the sleep mode, the drive electrode driver 14 also applies the DC voltage signal at the same voltage level as that of the drive signal for display in the period in which the drive electrode COML is not selected by the gate driver 12. However, the drive electrodes COML may be in a floating state where no voltage signal is applied and the potential thereof is not fixed.

The display device 1 with a touch detection function repeats the display stop period $Pe_n$ and the second display period $Pd2_n$ to perform the display operation by scanning the entire display surface. Thereafter, when the detection period control signal Vsp is activated (to the high voltage level), the frequency of the second switching control signal Vsw2 is changed to the first frequency for the normal operation mode, and the second switching control signal Vsw2 is output.

When the second switching control signal Vsw2 in the activated state (at the high voltage level) while the detection period control signal Vsp is activated (at the high voltage level), the second touch detection periods $Ps_1$ to $Ps_3$ start. In the second touch detection periods $Ps_1$ to $Ps_3$, the second touch detection operation is performed, and the second drive signal Vx is supplied from the touch detection electrode driver 102 to the touch detection electrodes TDL. The second drive signal Vx is simultaneously applied to the touch detection electrodes TDL. The self-capacitance of the touch detection electrodes TDL changes the second touch detection signal Vdet2 output from the touch detection electrodes TDL. The touch detection control unit 100 detects whether the conductor such as a finger is in contact with or in proximity to the touch detection electrodes TDL based on the change in the second touch detection signal Vdet2. The second touch detection operation can detect the touch input to the display region, and can also detect the input to, for example, a button part (not illustrated) provided separately from the display region.

If the contact or proximity of the conductor such as a finger is not detected, the detection period control signal Vsp is deactivated (to the low voltage level) as illustrated in FIG. 17, and the control unit 11 changes the frequency of the second switching control signal Vsw2 to the second frequency, and repeats the display stop period $Pe_n$ and the second display period $Pd2_n$. If the contact or proximity of the conductor such as a finger is detected, the display device 1 with a touch detection function shifts into the normal operation mode illustrated in FIG. 16.

In the second touch detection periods $Ps_1$ to $Ps_3$, the drive electrodes COML may be in a floating state where no voltage signal is applied and the potential thereof is not fixed. A voltage signal at the same voltage level as that of the second drive signal Vx applied to the touch detection electrodes TDL may be applied to the drive electrodes COML simultaneously with the application of the second drive signal Vx. The display operation is not performed in the second touch detection periods $Ps_1$ to $Ps_3$. Therefore, the scan signal lines GCL and the pixel signal lines SGL (refer to FIG. 12) may be in a floating state, or a voltage signal at the same voltage level as that of the second drive signal Vx may be applied thereto simultaneously with the application of the second drive signal Vx.

As described above, the display device 1 with a touch detection function time-divisionally performs, based on the image signal Vsig, the display operation (in the first display period $Pd1_n$ and the second display period $Pd2_n$) of activating the image display function of the display function layer (liquid crystal elements LC) by applying the pixel signals Vpix between the pixel electrodes 22 and the drive electrodes COML, and the display stop operation (in the first touch detection period $Pm_n$ and the display stop period $Pe_n$) of not performing the display operation. In the sleep mode, the display operation in the second display period $Pd2_n$ is performed based on the second switching control signal Vsw2 having the second frequency different from the first frequency for the normal operation mode. The second frequency is a frequency higher than the first frequency, and preferably be a frequency outside the human audible range. As a result, the display device 1 with a touch detection function of the present embodiment can suppress the noise generated by, for example, the power supply circuit 200 (refer to FIG. 10).

Second Embodiment

Figure 18:
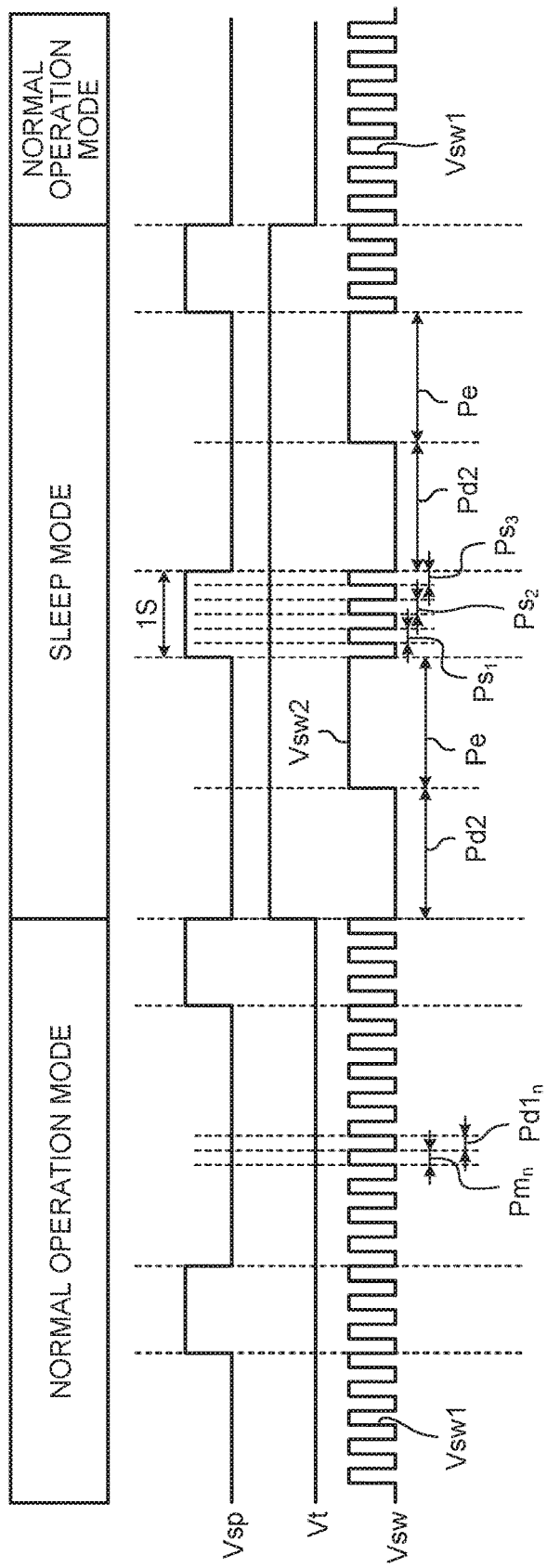
FIG. 18 is a timing waveform diagram illustrating an operation example of a display device with a touch detection function according to a second embodiment of the present invention in the normal operation mode and in the sleep mode.

FIG. 18 is a timing waveform diagram illustrating an operation example of a display device with a touch detection function according to a second embodiment of the present invention in the normal operation mode and in the sleep mode. The operation in the normal operation mode of the display device with a touch detection function according to the second embodiment is the same as that of the first embodiment. However, in the sleep mode, each of the operations in the second display period $Pd2_n$ and the display stop period $Pe_n$ is performed once in the operation period for one frame (1 F). Specifically, the control unit 11 sets the second frequency of the second switching control signal Vsw2 in the sleep mode to a frequency lower than the first frequency of the first switching control signal Vsw1. Therefore, in the sleep mode, the display operation and the display stop operation are performed in a time-division manner at the second frequency lower than the first frequency. For example, in the present embodiment, the second frequency is 60 Hz or lower.

In this case, the second frequency is deviated from a frequency of around 4 kHz at which high human auditory sensitivity is expected, thereby reducing the noise, or preventing the noise from annoying the user even if the noise is generated.

Third Embodiment

Figure 19:
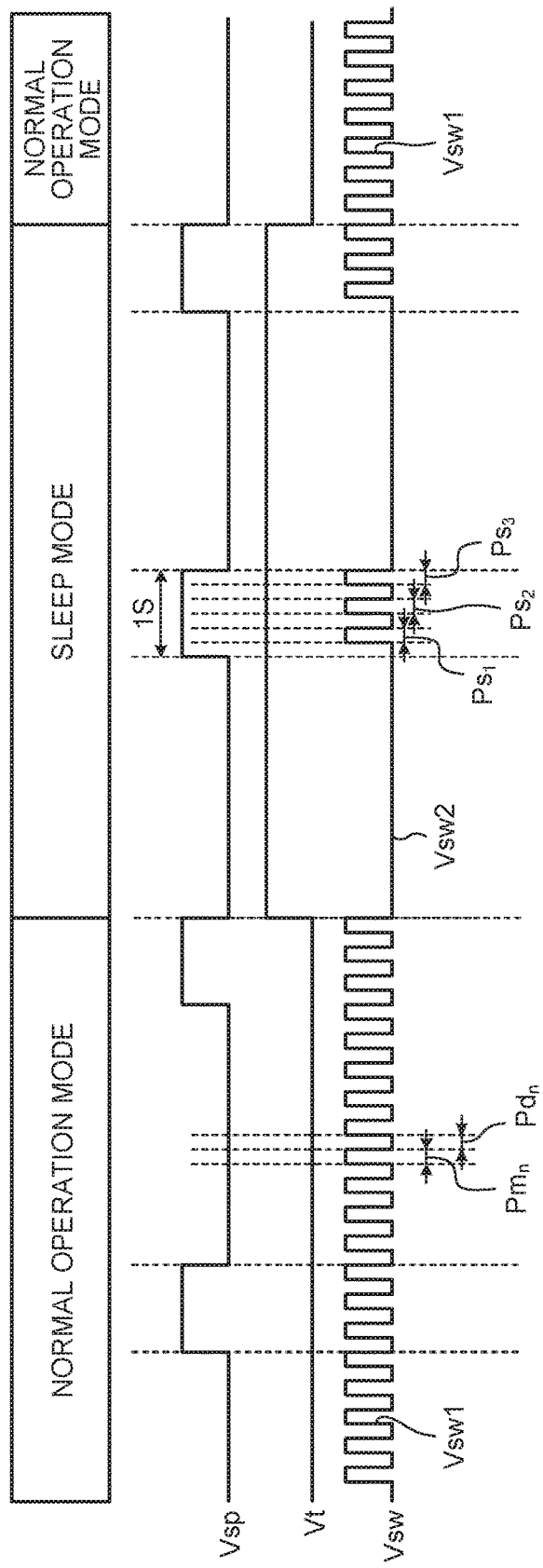
FIG. 19 is a timing waveform diagram illustrating an operation example of a display device with a touch detection function according to a third embodiment of the present invention in the normal operation mode and in the sleep mode.

FIG. 19 is a timing waveform diagram illustrating an operation example of a display device with a touch detection function according to a third embodiment of the present invention in the normal operation mode and in the sleep mode. The operation in the normal operation mode of the display device with a touch detection function according to the third embodiment is the same as that of the first embodiment. However, in the sleep mode, the first touch detection operation by the mutual capacitance method stops, and also the display operation stops. The second switching control signal Vsw2 becomes a DC voltage signal at the same voltage level as that of a low-voltage level part of the first switching control signal Vsw1. In the sleep mode, the gate driver 12 and the source driver 13 for driving the display operation stop operating, so that the power consumption can be further reduced. The power supply voltage also stops being supplied to the gate driver 12 and the source driver 13, so that the noise can be surely reduced.

In the sleep mode, at least one second touch detection period Ps is provided in the touch detection period (1 S) in which the detection period control signal Vsp is activated. In the present embodiment, the second switching control signal Vsw2 includes pulsed signals periodically repeated at the first frequency, and is provided with the second touch detection periods $Ps_1$ to $Ps_3$ in the touch detection period (1 S). In the second touch detection periods $Ps_1$ to $Ps_3$, when the second touch detection operation is performed and the contact or proximity of the conductor such as a finger is detected, the touch detection control unit 100 deactivates the operation mode control signal Vt, and outputs it to the control unit 11, which then returns to the normal operation mode.

The preferred embodiments of the present invention have been described above. However, the present invention is not limited thereto. Content disclosed in the embodiments is merely an example, and various modifications can be made without departing from the gist of the invention. The present invention naturally encompasses an appropriate modification maintaining the gist of the invention.

For example, while a frequency of the display operation differs between the normal operation mode and the sleep mode, a frequency at which the display operation and the display stop operation are performed in a time-division manner may be varied among a plurality of frames in the normal operation mode. The drive electrodes COML serve as common electrodes for applying a common potential to the pixels of the display panel 20, and also serve as drive electrodes of the touch panel 30. However, the touch panel 30 may be mounted on the display panel 20, and common electrodes of the display panel 20 and drive electrodes of the touch panel 30 may be separately provided. In the second and third touch detection operations by the self-capacitance method, the contact or proximity of the external conductor may be detected based on the self-capacitance of the drive electrodes COML. In this case, the drive electrode driver 14 may supply the second drive signal Vx to the drive electrodes.

What is claimed is:

1. A display device with a touch detection function comprising:
   a substrate;
   a plurality of pixel electrodes on the substrate and in a display region where an image is displayed;
   a display function layer having an image display function and configured to display the image in the display region;
   a plurality of drive electrodes facing the pixel electrodes;
   a plurality of touch detection electrodes facing the drive electrodes;
   a control circuit configured to output control signals each switching between a display operation period and a display stop period, wherein
   the image is displayed in the display operation period,
   the image is not displayed in the display stop period,
   the display operation period and the display stop period are alternately arranged in a time-division manner in one frame,
   the control signals include a first control signal having a first frequency and a second control signal having a second frequency different from the first frequency,
   the first control signal switches between the display operation period and the display stop period with the first frequency in a first operation mode, and
   the second control signal switches between the display operation period and the display stop period with the second frequency in a second operation mode.

2. The display device with a touch detection function according to claim 1, wherein
   the first touch detection operation is performed in the display stop period controlled by the first control signal in the first operation mode, and
   the touch detection operation is not performed in the display stop period controlled by the second control signal in the second operation mode.

3. The display device with a touch detection function according to claim 1, wherein the second frequency is a frequency outside a human audible range.

4. The display device with a touch detection function according to claim 3, wherein the second frequency is 20 kHz or higher.

5. The display device with a touch detection function according to claim 1, wherein the second frequency is 60 Hz or lower.

6. The display device with a touch detection function according to claim 1, wherein the second operation mode is a sleep mode.

7. The display device with a touch detection function according to claim 1, wherein
the second operation mode includes a first period in which the second control signal switches between the display operation period and the display stop period and a second period in which the second control signal does not switch between the display operation period and the display stop period, and
a second touch detection operation is performed to detect whether an external conductor is in contact with or in proximity to the display region at least once in the second period.

8. The display device with a touch detection function according to claim 1, further comprising:
a touch detection circuit configured to detect a position of a touch input to the display region based on a detection signal from the touch detection electrodes in the first operation mode; and
a touch detection control circuit configured to detect whether an external conductor is in contact with or in proximity to the display region in the second operation mode, wherein
the control circuit is configured to switch between the first control signal and the second control signal based on a detection signal from the touch detection control circuit.

9. The display device with a touch detection function according to claim 1, wherein a position of a touch input is detected based on mutual capacitance between the drive electrodes and the touch detection electrodes in the first operation mode.

10. The display device with a touch detection function according to claim 1, wherein whether an external conductor is in contact with or in proximity to the display region is detected based on self-capacitance of the touch detection electrodes.

11. The display device with a touch detection function according to claim 1, wherein the display stop period in the first operation mode includes a first touch detection period, and
the display operation period and the first touch detection period are alternately arranged in a time-division manner in the one frame.

12. The display device with a touch detection function according to claim 11, wherein the first operation mode includes a third touch detection period after the display operation period and the first touch detection period, and
the control circuit is configured to switch from the first control signal to the second control signal when a touch input is not detected during the third touch detection period.

13. The display device with a touch detection function according to claim 1, wherein the second operation mode includes a second touch detection period after the display operation period and the display stop period, and
the control circuit is configured to switch from the second control signal to the first control signal when a touch input is detected in the second touch detection period.

14. A display device with a touch detection function comprising:
pixels;
drive electrodes;
touch detection electrodes facing the drive electrodes; and
a driver configured to receive a first control signal with a first frequency and a second control signal with a second frequency different from the first frequency,
wherein the first control signal switches between a display operation period and a first touch detection period with the first frequency in a first operation mode,
the second control signal switches between the display operation period and a display stop period with the second frequency in a second operation mode,
the pixels display an image in the display operation period,
the pixel does not display an image in the display stop period,
the display operation period and the first touch detection period are alternately arranged in a time-division manner in one frame, and
the display operation period and the display stop period are alternately arranged in a time-division manner in one frame.

15. The display device with a touch detection function according to claim 14, wherein the driver supplies a drive signal to the drive electrodes on a basis of the first and second control signals.

16. The display device with a touch detection function according to claim 14, wherein the second operation mode includes a second touch detection period after the display operation period and the display stop period, and
a control signal that the driver receives is switched from the second control signal to the first control signal when a touch input is detected in the second touch detection period.

17. The display device with a touch detection function according to claim 14, wherein the first operation mode includes a third touch detection period after the display operation period and the first touch detection period, and
a control signal that the driver receives is switched from the first control signal to the second control signal when a touch input is not detected during the third touch detection period.

18. The display device with a touch detection function according to claim 14, wherein a video information corresponding to an image of one frame is supplied to the pixels,
the display operation period is divided into display periods,
the video information is divided into divided signals, and
the divided signals are supplied to some of the pixels, respectively, in one of the display periods.

* * * * *